United States Patent [19]

Klang

[11] Patent Number: 6,037,751

[45] Date of Patent: Mar. 14, 2000

[54] METHOD AND APPARATUS FOR CHARGING BATTERIES

[75] Inventor: James K. Klang, Eagan, Minn.

[73] Assignee: GNB Technologies, Inc., Mendota Heights, Minn.

[21] Appl. No.: 09/108,929

[22] Filed: Jul. 1, 1998

[51] Int. Cl.[7] .................................................. H01M 10/44
[52] U.S. Cl. ........................ 320/160; 320/156; 320/129
[58] Field of Search .................................... 320/127, 129, 320/156, 160, 161

[56] References Cited

U.S. PATENT DOCUMENTS

| | | | |
|---|---|---|---|
| 4,146,830 | 3/1979 | Foster | 320/160 |
| 4,745,349 | 5/1988 | Palanisamy et al. | 320/125 |
| 4,829,225 | 5/1989 | Podrazhansky et al. | 320/129 |
| 5,160,880 | 11/1992 | Palanisamy | 320/106 |
| 5,307,000 | 4/1994 | Podrazhansky et al. | 320/129 |
| 5,367,244 | 11/1994 | Rose et al. | 320/141 |
| 5,469,043 | 11/1995 | Cherng et al. | 320/161 |
| 5,583,416 | 12/1996 | Klang | 320/160 |
| 5,589,757 | 12/1996 | Klang | 324/430 |
| 5,633,576 | 5/1997 | Rose et al. | 320/160 |
| 5,656,920 | 8/1997 | Cherng et al. | 320/161 |

*Primary Examiner*—Peter S. Wong
*Assistant Examiner*—Gregory J. Toatley, Jr.

[57] ABSTRACT

A method and apparatus for efficiently charging lead-acid batteries applies small voltage steps to probe the charging efficiency of a battery being charged. The application of a voltage step causes the current to change from a base current to a surge current immediately after the voltage step, and to decay asymptotically to a plateau current after the surge current. A current ratio, defined as the difference between the plateau current and the base current divided by the difference between the surge current and the base current, is used as an indicator of the charging efficiency. The output voltage of the power supply charging the battery is then adjusted according to the measured current ratio. A current-voltage slope, defined as the difference between the plateau current and the base current divided by the magnitude of the voltage step, may also be used as an indicator of the charging efficiency for controlling the charging process. Alternatively, in a current-controlled charging process, small current steps are used to probe the charging efficiency. For a current step, the induced voltage changes are measured, and a transient-plateau voltage ratio is calculated. The charging current is then adjusted according to the calculated voltage ratio.

33 Claims, 17 Drawing Sheets

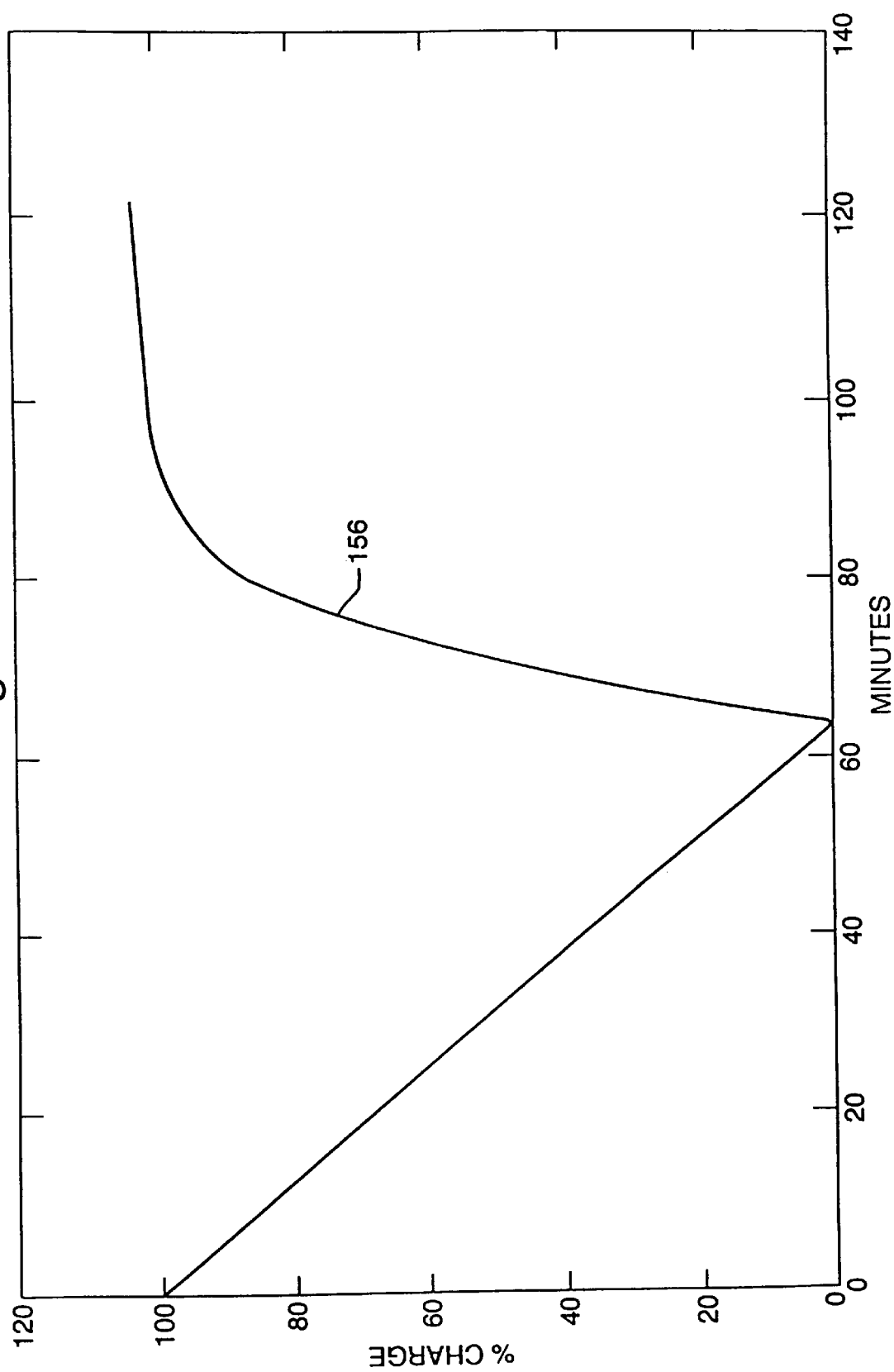

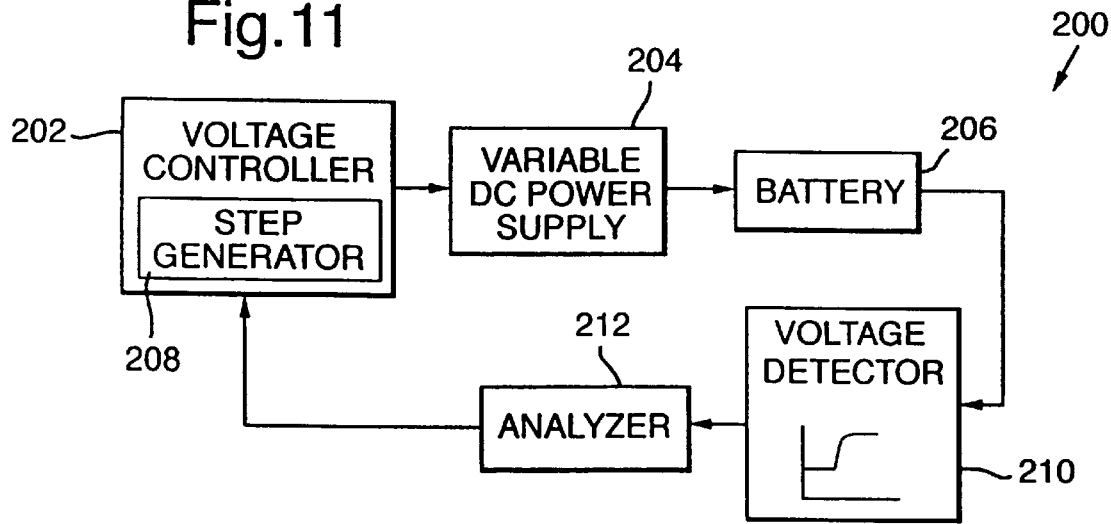
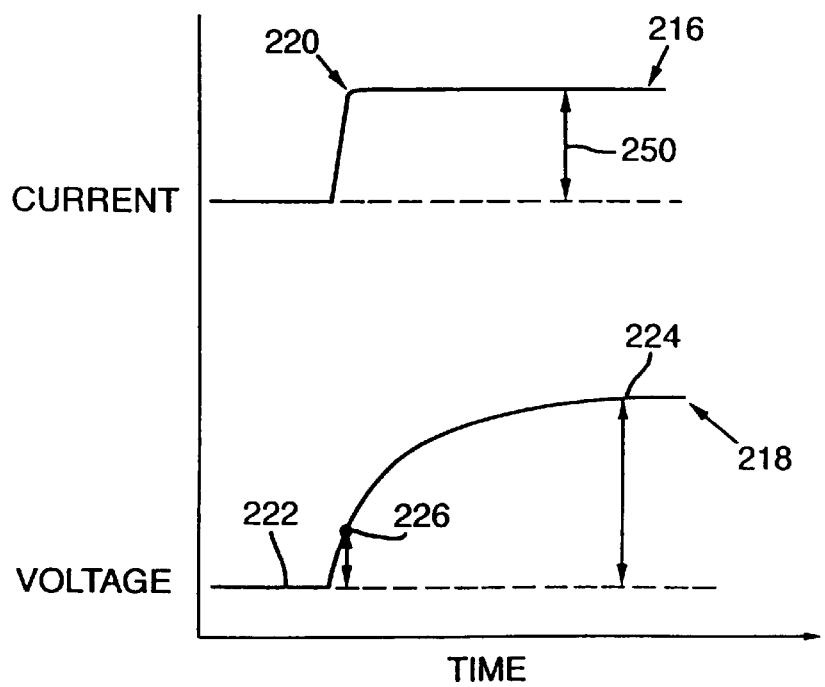

METHOD AND APPARATUS FOR CHARGING BATTERIES

FIELD OF THE INVENTION

This invention relates generally to battery chargers and more particularly to a method and apparatus for charging batteries that dynamically controls the charging voltage or current to achieve efficient charging.

BACKGROUND OF THE INVENTION

Batteries such as lead-acid batteries have been used for many diverse applications. For example, lead-acid batteries have been used as a starting, lighting and ignition power source for vehicles (SLI), as a power source for starting, lighting and other auxiliary power requirements in marine applications, and as a motive power source for use in golf carts and other electric vehicles. In addition, lead-acid batteries have been employed in a variety of stand-by power applications to provide a power source when the main power source becomes inoperable, as by, for example, interruption of electricity. Other representative applications for lead-acid batteries include uniform power distribution and power damping applications.

While the extent of discharge and the particular cycling requirements of a lead-acid battery for a specific application vary widely, one criterion remains constant. Specifically, it is important to ensure that proper charging of such batteries is carried out. Undercharging lead-acid batteries can result in less than optimum output and service life. For example, undercharging can result in perhaps permanent sulfation of part of the active materials, as well as stratification of the electrolyte and uneven use of the active materials.

On the other hand, undue overcharging of lead-acid batteries likewise can result in permanent damage to the batteries and can present potential safety hazards caused by, for example, dissociating the water in the electrolyte of the battery to gas. Further, overcharging lead-acid batteries can accelerate positive grid corrosion and even lead to bulging and/or buckling of the battery plates. Among other undesirable aspects of undue overcharging are an increase in the specific gravity of the electrolyte, possible oxidation of the separators and the undue heat generated that can accelerate various problems.

The time and manner in which lead-acid batteries are charged is also important. For example, many applications require charging within a relatively short period of time. In such circumstance, it is important to optimize the current or voltage used while, at the same time, avoiding the use of currents higher than the battery can accept for charging conversion.

U.S. Pat. No. 5,583,416 and U.S. Pat. No. 5,656,920, which are assigned to the same assignee as the present application and hereby incorporated by reference in their entirety, each disclose inventive methods and apparatus for charging batteries which avoid undercharging, overcharging and their associated adverse effects. For example, U.S. Pat. No. 5,583,416 discloses a method and apparatus for charging batteries which periodically applies voltage steps to the battery being charged to monitor the charging acceptance of the battery. At the beginning of the charging process, an initial target voltage is applied to the battery. The monitoring process includes increasing the applied voltage in two predetermined steps. The corresponding charging currents are measured at the initial applied voltage and at the two voltage steps. Based on these measurements, the current differentials (i.e., the current change for each voltage step range) are determined. The current differentials are compared to determine whether the increased voltage or the decreased voltage results in a more optimal charge acceptance, as indicated by a lower current differential. The target charging voltage is then adjusted in the direction of the smaller current differential, which indicates a more optimal charge acceptance. This monitoring process is repeated throughout the charging process to continuously adjust the charging voltage to approach a more optimized charge acceptance level. Alternatively, the charging current is controlled and stepped and the corresponding voltages are measured to determine the voltage differentials.

U.S. Pat. No. 5,656,920 discloses a charging method and apparatus which periodically applies voltage sweeps to the battery being charged to determine the optimal charging acceptance of that battery. Specifically, the charging voltage is "swept" across a range of values and the resulting current changes are measured. The range of the sweep is preferably from about the open-circuit voltage of the battery to just above the voltage region that provides the desired optimal charging performance. The current-voltage curve developed by this sweep is then analyzed to determine the charging voltage that corresponds to the optimal charging performance. The analysis of the current-voltage sweep curve is carried out, for example, by comparing the slope values at different points on the sweep curve to determine minimum or specific values. The voltage sweeps are performed periodically and the charging voltage is adjusted accordingly to provide optimized charging performance.

The methods disclosed in these two related U.S. applications provide satisfactory charging performances. However, these methods have their own system requirements. The step-charging method, for instance, requires a charging system which is capable of relatively precise voltage control so that the current differentials can be accurately determined. The voltage-sweep method also requires precise voltage control and is best suited for applications wherein the electrical system powered by the battery is relatively insensitive to the relatively large voltage changes caused by the voltage sweeps.

OBJECTS OF THE INVENTION

It is, therefore, a primary object of the present invention to provide an improved method and apparatus for charging batteries. It is a more specific object to provide such a method and apparatus that dynamically adjusts the electrical charging output supplied to the battery to achieve efficient charging performance without unduly overcharging or undercharging the battery. It is a related object to provide a method and apparatus for charging batteries that is interactive with the battery being charged so that the charging process will inherently take into account the specific factors affecting the charging characteristics of the specific battery being charged so as to optimize the charging profile of that specific battery. It is another related object to provide a simple interactive method and apparatus for charging batteries that regularly probes the charging efficiency during the charging process and adjusts the charging output to achieve substantially optimal charging performance. It is still another related object to provide such an interactive method and apparatus that can be used in a relatively noisy electrical environment and that does not need precise voltage control in the probing process.

It is yet another object of the invention to provide an interactive method and apparatus for charging a battery that minimizes interference with the operation of other electrical systems connected to the battery being charged.

It is still another object of the invention to provide an interactive charging method and apparatus which is capable of effectively controlling the level of charge below full charge in a periodic charging system such as a hybrid electric vehicle or the like.

SUMMARY OF THE INVENTION

The present invention accomplishes these objectives, and overcomes the drawbacks of the prior art by providing a method and apparatus for charging batteries which periodically applies small voltage or current steps to the battery to probe the charging efficiency of the battery. The current changes induced by a voltage step or voltage changes induced by a current step are used to derive a ratio which is used as a control parameter. The ratio is compared to a reference level, which may be fixed or dynamically adjusted during the charging process according to the calculated ratios. The charging voltage or current is then varied according to the result of the comparison.

In accordance with a feature of one embodiment which applies voltage steps to probe the battery charging efficiency, a voltage detector detects the base current immediately before a voltage step is applied, a surge current after the voltage step is applied, and a plateau current after the surge current. The ratio is calculated as the difference between the plateau current and the base current divided by the difference between the surge current and the base current. Alternatively, the ratio may be a current-voltage slope, defined as the difference between the plateau current and the base current divided by the magnitude of the voltage step.

In another embodiment which controls the charging current, current steps are applied to the battery to probe the charging efficiency. For each current step, a base voltage, a transient voltage, and a plateau voltage are measured for deriving a transient-plateau voltage ratio. The charging current is varied according to the transient-plateau voltage ratio to achieve efficient charging of the battery.

These and other objects and advantages of the invention will be more readily apparent upon reading the following description of the preferred embodiment and upon reference to the accompanying drawings wherein:

BRIEF DESCRIPTION OF THE DRAWINGS

FIGS. 8A & 8B are graphs showing data of a charging process for a battery mounted in a vehicle using the technique shown in FIG. 5;

FIG. 11 is a block diagram of an alternative battery charging system for current-controlled charging;

FIG. 12 is a graph illustrating the effect of applying a small current step to a battery on the charging voltage experienced by the battery;

Figure 1:
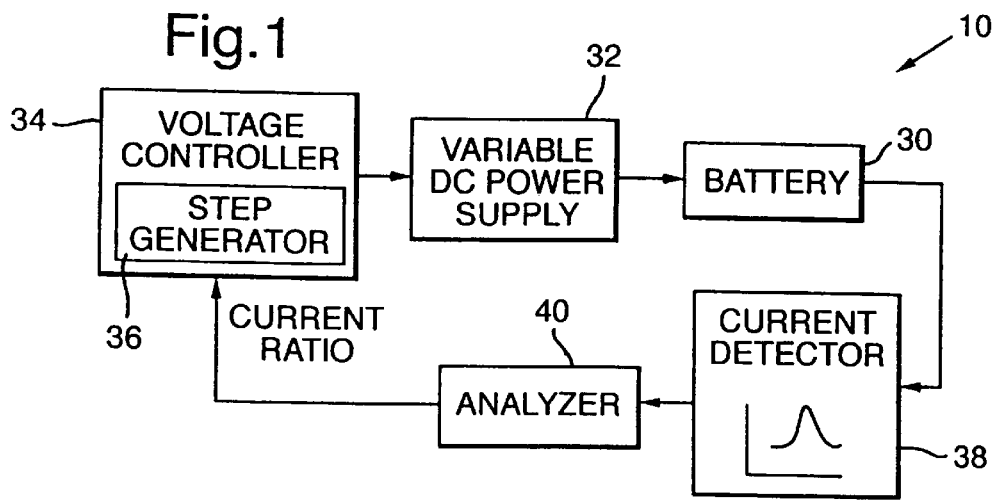
FIG. 1 is a block diagram of an exemplary battery charging system constructed according to the present invention for voltage-controlled charging.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the intention is to cover all modifications, alternative constructions and equivalents falling within the spirit and scope of the invention as defined by the appended claims.

DETAILED DESCRIPTION OF THE PREFERRED EMBODIMENT

In accordance with the present invention, small voltage or current steps in either the positive or negative direction are periodically applied to a battery being charged to probe the charging efficiency of the battery. The current changes induced by a voltage step or the voltage changes induced by a current step are then used to derive a quantitative indicator (or control parameter) for controlling the charging process.

FIG. 1 shows a charging system 10 for a voltage-controlled charging process in which voltage steps are applied as probes to a battery 30 being charged, and the charging voltage is dynamically varied according to the results of the probing. The charging system 10 has a DC power supply 32 which is connected to the battery 30 to a provide a charging voltage and charging current. A voltage controller 34 controls the voltage output of the DC power supply 32. The voltage controller 34 includes a voltage step generator 36 which is capable of causing the output voltage of the DC power supply to selectively change by a small voltage step. Preferably, the small voltage step falls in the range of 0.01 to 0.3 volt inclusive for a 12-volt battery, although larger or smaller voltage steps can likewise be employed without departing from the invention.

As will be discussed in greater detail below, application of a small voltage step to the battery 30 induces transient changes in the charging current which can be analyzed to provide information about the charging efficiency of the battery 30. These transient current changes are detected by a current detector 38, and, once detected, analyzed by an analyzer 40. The analyzed result is then sent to the voltage controller 34, which uses the analyzed result to adjust the charging voltage so that the charging voltage is substantially optimized to efficiently charge the battery and to avoid both undue undercharging and overcharging.

Figure 2A:
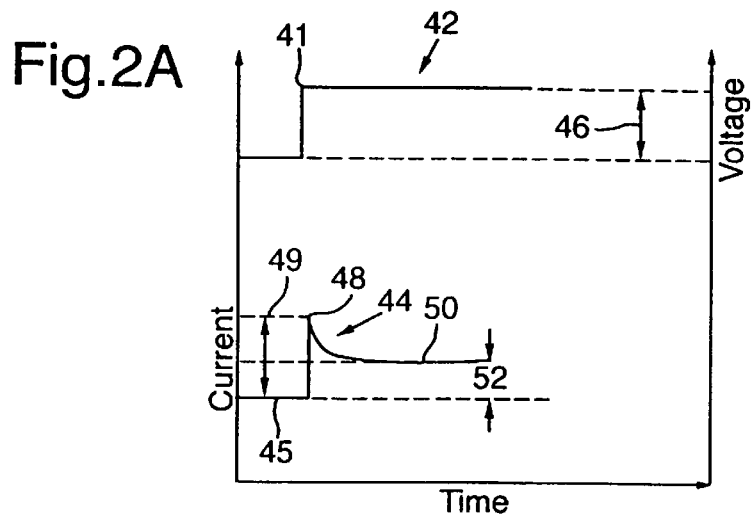
FIG. 2A is a graph illustrating the effect of applying a small voltage step to a nearly charged battery on the charging current experienced by that battery.

As mentioned above, the transient changes in the charging current induced by the voltage step provide information regarding the battery charging efficiency. By way of explanation, the effect of applying an exemplary voltage step 41 to a nearly fully charged, representative battery is illustrated in FIG. 2A. The charging voltage as a function of time is indicated by the voltage curve 42, and the charging current as a function of time is indicated by the current curve 44. Immediately before the voltage step 41 is applied, the charging current is in a substantially steady state condition defined as a base current 45. When the charging voltage is incremented by the voltage step 41, the current first surges for a fraction of a second (e.g., about 0.1 second) to a peak, and then asymptotically decays to a steady state condition represented by plateau 50. This decay typically occurs within several tenths of a second. The peak current experienced during the surge is defined as the surge current 48. The current represented by the plateau 50 is defined as the plateau current 50.

Figure 2B:
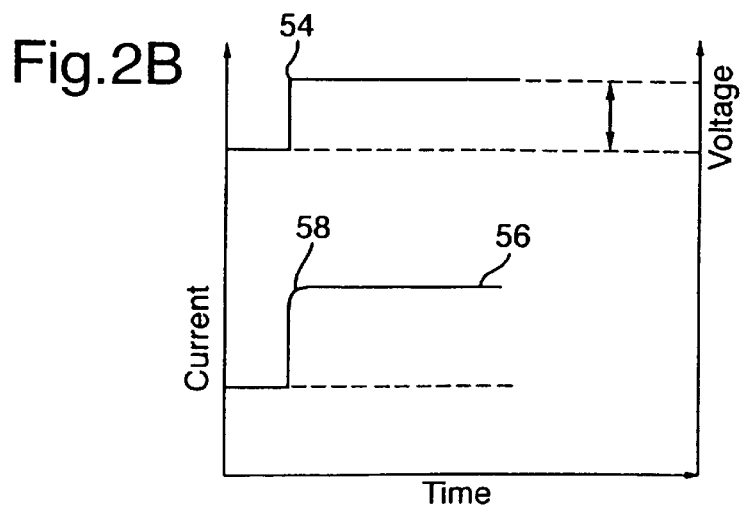
FIG. 2B is a graph similar to FIG. 2A but illustrating the effect of applying a similar voltage step to the battery when the battery is substantially discharged.

The transient current changes induced by applying the voltage step depend on the charging status of the battery. When a step 41 is applied to a battery which is charged to a different level than the exemplary battery 30 depicted in FIG. 2A, the transients induced in the charging current will have a different profile, e.g., it might have a higher or lower surge current or a higher or lower plateau current. By way of another example, the effect of applying a voltage step to a substantially discharged battery is shown in FIG. 2B. When a voltage step 54 is applied to the substantially discharged battery, substantially no surge current can be identified and the charging current increases to the plateau current 56 without experiencing a peak. Another way to look at this curve is that a surge current 58 is present, but it is substantially masked by the plateau current 56.

In accordance with a feature of an embodiment of the invention, the base current 45, the surge current 48, and the plateau current 50 are measured and analyzed to provide information for controlling the charging process. Pursuant to this aspect of the invention, a ratio is derived from the measured currents and used as a control parameter for the charging process to control the charging voltage applied to the battery.

In a preferred embodiment, the control parameter is a surge-plateau current ratio defined as the difference between the plateau current 50 and the base current 45 (i.e., the plateau current increase 52) divided by the difference between the surge current 48 and the base current (i.e., the surge current increase 49). The surge-plateau current ratio provides an effective indicator of the charging efficiency of the battery 30. By repeatedly applying voltage steps to the battery being charged and calculating a current ratio for each voltage step, the charging process can be controlled to ensure that the battery is being charged at an efficient rate for an appropriate length of time. By interactively adjusting the charging voltage applied to the battery 30, a substantially optimized charging performance, (e.g., high charging efficiency without undue overcharging or gassing), is achieved.

In an alternative embodiment, the control parameter is a "current-voltage slope" defined as the difference between the plateau current 50 and the base current 45 divided by the magnitude of the voltage step (i.e., the difference between the plateau voltage and the base voltage).

Figure 3:
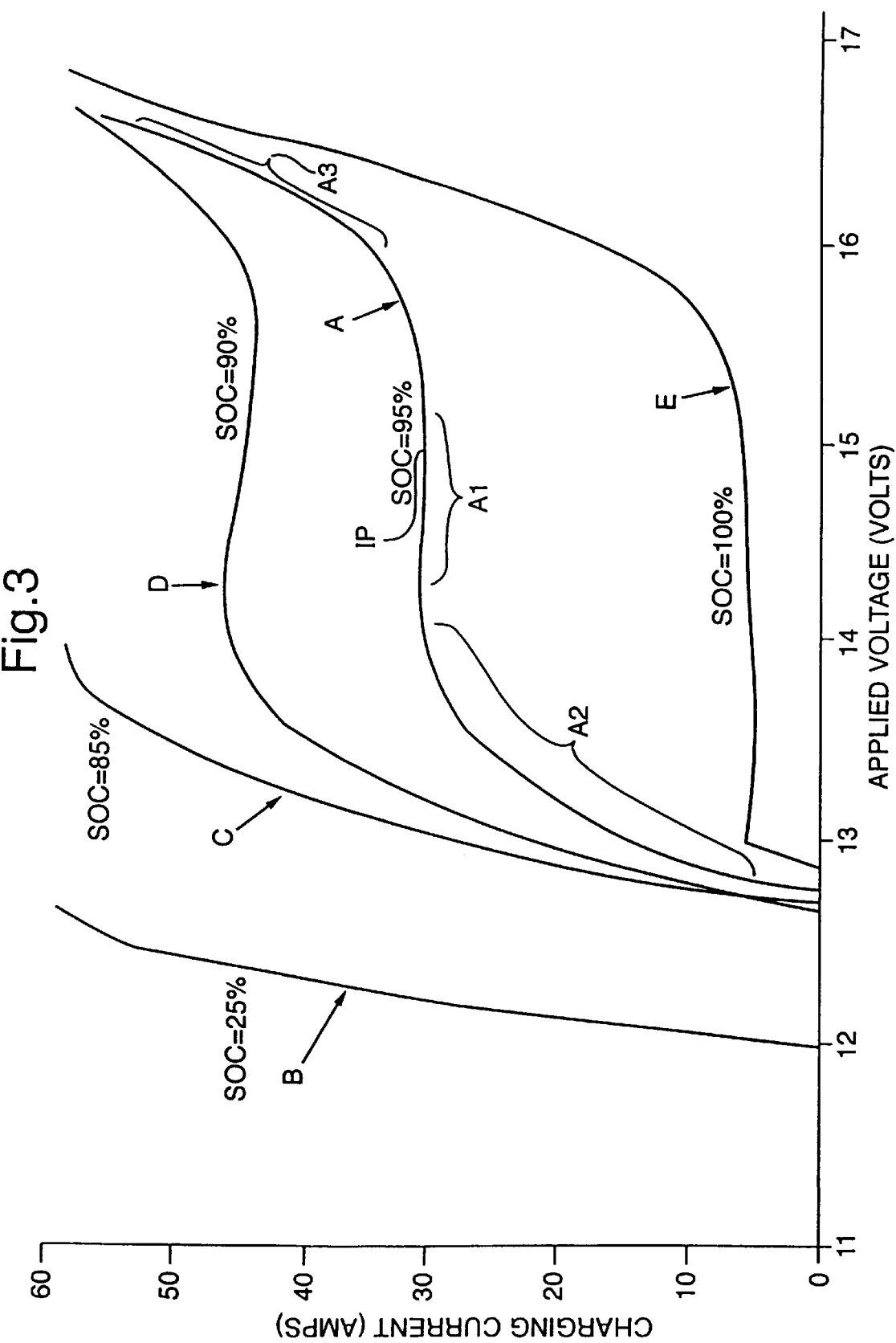
FIG. 3 is a graph illustrating variations of the charging current for a battery as a result of voltage sweeps at different states-of-charge of the battery.

It will be appreciated that the surge-plateau current ratio and the current-voltage slope as defined above are both related to the current-voltage sweep curves developed by the method and apparatus disclosed in U.S. Pat. No. 5,656,920. More specifically, as discussed in detail in U.S. Pat. No. 5,656,920, for a battery at a given temperature, sweeping the charging voltage produces a current-voltage curve that is characteristic of the state-of-charge of the battery. In other words, at a given temperature, a battery being charged will exhibit a family of voltage sweep curves corresponding to different states-of-charge as the charging continues. FIG. 3 shows, as an example, voltage sweep curves for a commercially available Group 65 lead-acid battery which was fully charged and then discharged to various states at a rate of 4 Amperes. The five curves A–E correspond to the states-of-charge of 95%, 25%, 85%, 90%, and 100%, respectively. These sweep curves are generated using a voltage sweep from 12.5 volts to 16.5 volts at a sweep rate of 0.5 Volt/second. The temperature of the battery is about 73.5 F.

As shown in FIG. 3, when the battery is not substantially charged, the current rises sharply with the charging voltage and often reaches the current limit of the power supply, as exemplified by curves B and C, which correspond to the states-of-charge of 25% and 85%, respectively. Thus, the voltage-current sweep curve of the battery in a relatively low state-of-charge tends to have fairly high slopes. For relatively high states-of-charge, however, the sweep curves have a common general shape which includes two relatively high-slope sections on the two sides of a relatively flat portion. For example, curve A, which corresponds to a state-of-charge of 95%, has a first upward portion A2, a relatively flat portion A1, and a second upward portion A3. The relatively flat portion A1 has an inflection point IP where the sweep curve A has a minimum slope.

The sweep curves provide useful information for determining an optimal range of the charging voltage which varies as the battery is being recharged. Turning again to curve A, to achieve optimal charging performance at this state-of-charge, the charging voltage should be in the relatively flat portion A1 of curve A. Setting the voltage in the portion A2 would involve utilizing less than optimal charging current. On the other hand, setting the charging voltage in the portion A3 well above the portion A1 could result in excessive gassing and, accordingly, less than optimal charging performance. Since the portion A1 which provides optimal charging performance also corresponds to the portion of the sweep curve with the lowest slopes, the slope of the curve at a given charging voltage can be used as an indicator as to whether the charging voltage is optimally set.

It will be appreciated that the sweep curves of a given battery vary depending on many factors such as the temperature, the history of use of the battery, and the discharge rate prior to recharging, etc. Nevertheless, the sweep curves retain the general characteristics described above in conjunction with FIG. 3. Thus, the slope, i.e., the variation of the current as a function of the voltage, provides a good indicator for use in adjusting the charging voltage for optimizing charging performance.

Figure 4:
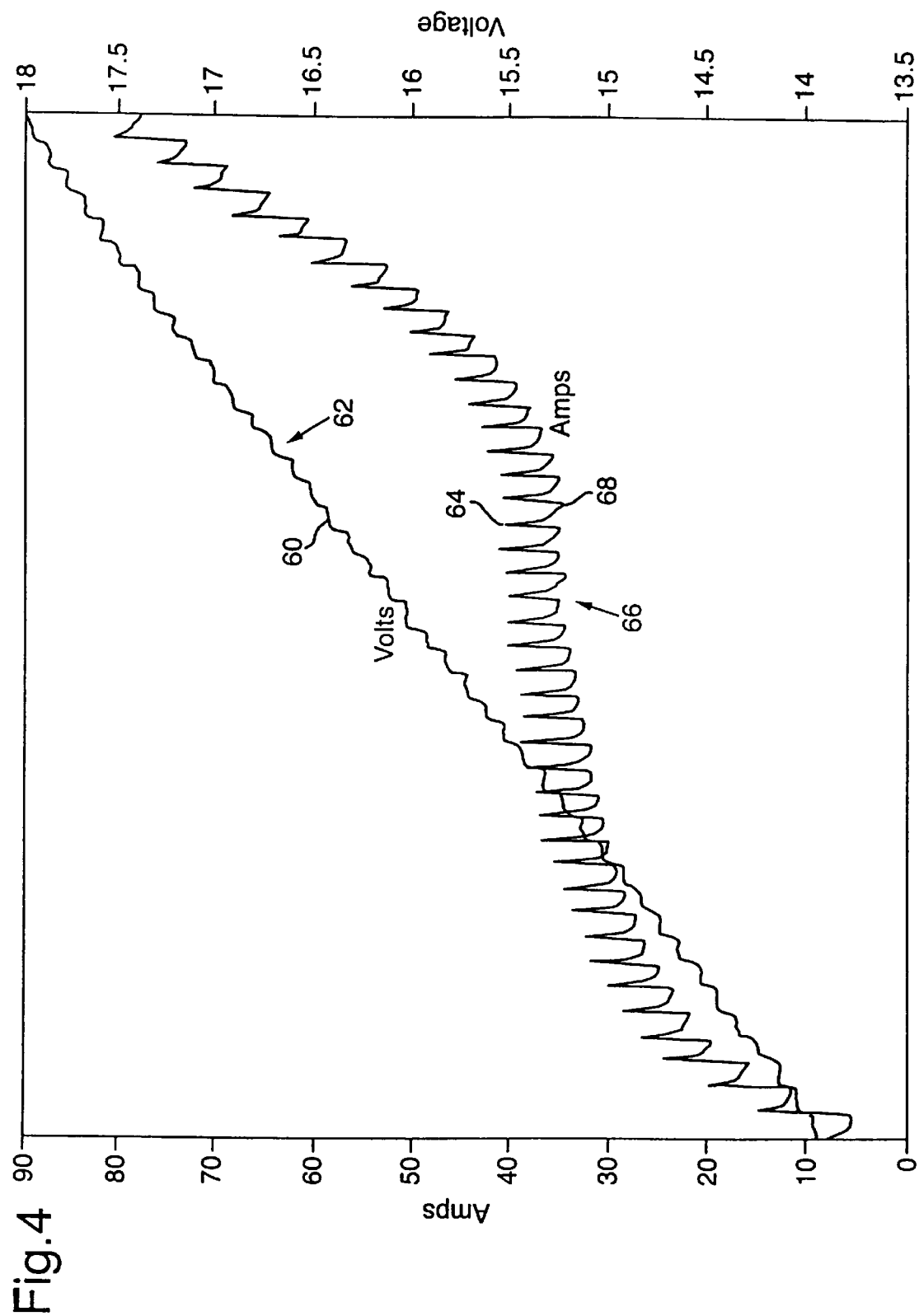
FIG. 4 is a graphical representation of the charging current changes resulting from the application of consecutive voltage steps to the exemplary battery of FIG. 1 when it is partially discharged.

The plateau-surge current ratio is also a good indicator of the charge acceptance that can be effectively used in controlling the charging process. The relationship between the plateau-surge current ratio developed by applying a small voltage step to the battery as described above and the sweep curves can best be seen by referring to FIG. 4. FIG. 4 shows the changes in battery current as a function of time as consecutive voltage steps separated by a fixed time interval are applied to a partially discharged battery. As discussed above, for each voltage step 60 in the voltage curve 62 there is a surge current peak 64 in the current curve 66 which decays asymptotically to a plateau current 68. As can be seen in FIG. 4, when viewed together, the plateau currents 68 trace a curve which resembles the voltage-current sweep curve A of FIG. 3.

The surge current 48 can generally be considered the result of the capacitance of the battery 30 being charged. A small change in voltage will require a current surge to charge or discharge the electrolyte double layers of the electrodes. When the battery 30 is substantially discharged or if the charging voltage is well below the optimal charging level, this capacitance effect is essentially masked by the large charge acceptance of the battery. In such a case, the current ratio will be high, (e.g., close to one), which is the case shown in FIG. 2B.

When the battery is partially discharged, a point which corresponds to the minimum current ratio occurs at or near the inflection point on the sweep curve A in FIG. 3 where the slope has a minimum value. This minimum ratio is different for different types of batteries, depending on factors such as the construction and materials of the specific battery. For flooded, maintenance-free automobile batteries with thin electrodes, the ratio may be close to zero. Other battery types, especially those with thicker plates and higher-gassing antimonial alloys, generally have a higher minimum ratio which typically is still a low fraction (e.g., less than 0.5).

It will be appreciated that a single surge-plateau current ratio or a current-voltage slope measured at a given charging voltage does not by itself indicate whether the charging voltage is in the optimal range such as the portion A1 of curve A in FIG. 3 or in ranges A2 or A3 of that curve. Nevertheless, a variety of techniques of this invention may be used to interactively adjust the charging voltage according to the measured surge-plateau current ratio or the current-voltage slope to achieve substantially optimal charging performance.

Two different exemplary interactive voltage adjustment techniques employing voltage steps to probe the charging state of the battery are described below. It will be appreciated, however, that these two techniques are described here only as examples, and other charging techniques which adjust the charging voltage according to the measured plateau-surge current ratio or current-voltage slope may be used without deviating from the scope or spirit of the present invention.

TECHNIQUE ONE

In this technique, which is particularly useful for automotive applications, a voltage step such as that shown in FIG. 2A is periodically applied to the battery being charged. The measured ratio induced by each voltage step is compared to a predetermined fixed reference level. The charging voltage is then adjusted according to the result of the comparison. The term "ratio" as used herein in the context of applying small voltage steps to probe the battery charge conditions, unless otherwise specified, is intended to cover both the surge-plateau current ratio and the current-voltage slope as defined above.

Figure 5:
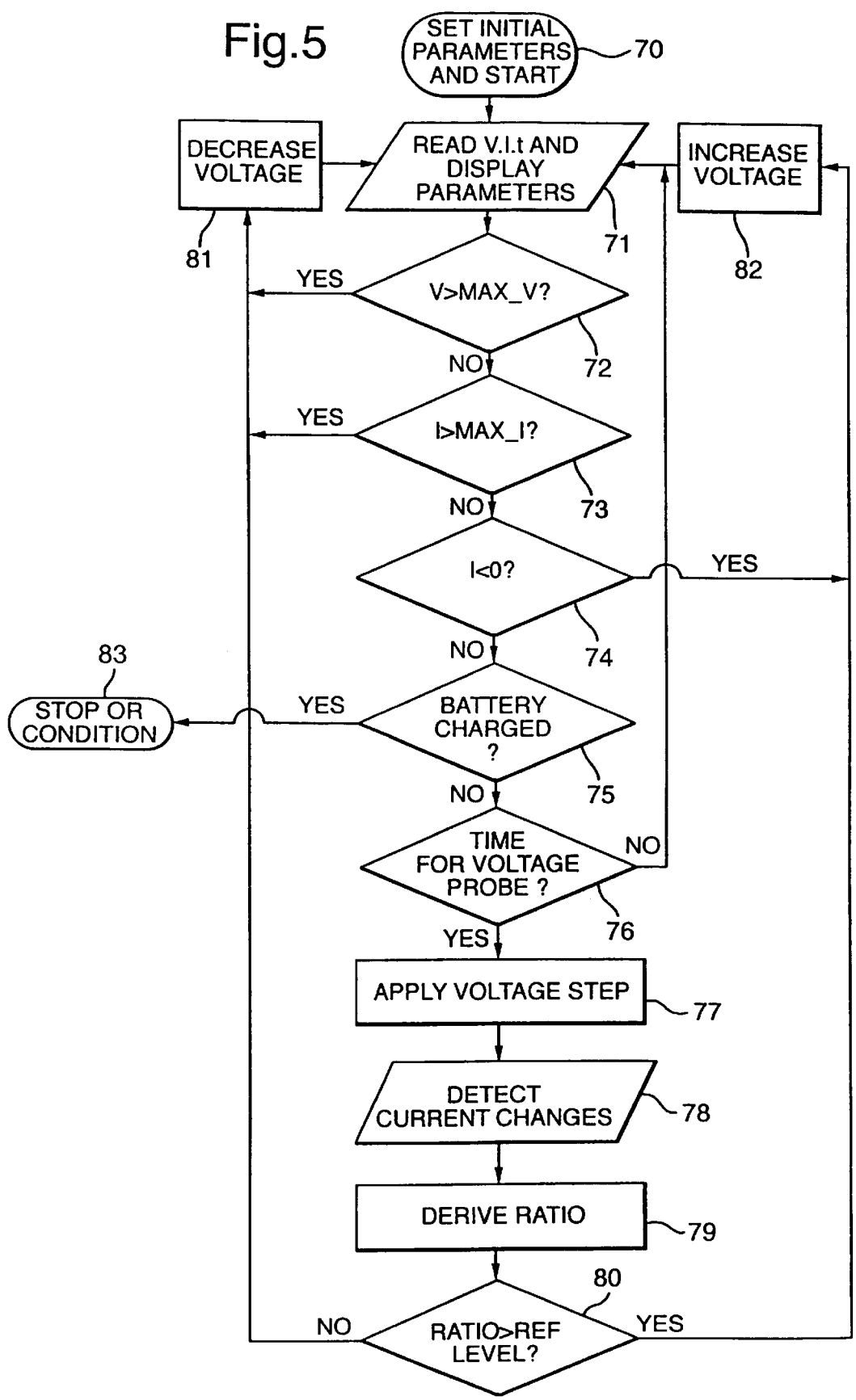
FIG. 5 is a flow diagram for an exemplary interactive voltage adjustment technique in accordance with the teachings of the invention.

As illustrated in FIG. 5, at the beginning of the charging process, the initial parameters, including the initial charging voltage and the fixed reference level, are set (step 70). The initial charging voltage is set by the voltage controller 34 at a relatively low initial value. As illustrated in FIG. 3, for a substantially discharged battery, the charging current increases rapidly with the charging voltage and often reaches the current limit of the power supply 32.

As the charging continues, the charging voltage and current as well the charging time are detected and may optionally be displayed on a monitoring device (step 71). It is then determined whether the charging voltage exceeds a preset upper voltage limit (MAX V) (step 72). If so, the voltage is decreased (step 81). If not, the current is also checked to see whether it exceeds a preset upper current limit (MAX I) (step 73). If so, the voltage is decreased (step 81). If it is determined that the current is negative (step 74), then the voltage is increased to provide positive current to the battery. If the voltage and current do not exceed the preset limits, and the charging current is not negative, it is then determined whether the battery has been fully charged (step 75). If so, the charging is either stopped or switched into a conditioning mode (step 83).

When it is determined that the time to measure the ratio has arrived (step 76), the voltage controller 34 causes the power supply 32 to change the charging voltage by a small step of a predetermined magnitude (step 77), which can be either positive or negative. The current detector 38 senses the current changes caused by this voltage step (step 78). The measured current values are then used by the analyzer 40 to calculate a ratio (step 79). The voltage controller 24 then compares the measured ratio to the fixed reference level (step 80).

In the preferred embodiment, if the ratio is higher than the reference value, the charging voltage is increased (step 81). As illustrated in FIG. 3, the slope of the sweep curve A in the portion A2 decreases as the voltage moves up. Thus, if the voltage is in the portion A2, increasing the charging voltage tends to reduce the ratio, thereby bringing the ratio closer to the reference level. On the other hand, if the measured ratio is below the reference level, then the charging voltage is decreased (step 82). The above described process from applying a voltage step through resetting the charging voltage is then periodically repeated as the charging continues.

The fixed reference level is preferably of a low value (e.g., 0.1 to 0.3 when the control parameter is the surge-plateau current ratio). As described above, the surge-plateau current ratio of a substantially discharged battery tends to be high (e.g., close to 1) at relatively low voltages at the beginning, but falls gradually as the state-of-charge and the charging voltage rise. Similarly, the current-voltage slope also tends to be higher at the beginning of the charging process and falls as the battery is charged. If the reference value is set too high, the ratio (which may be either the surge-plateau current ratio or the current-voltage slope) might drop below the reference value well before the battery becomes fully charged, and the charging voltage would accordingly be reduced to a level that is too low to fully charge the battery in a reasonable period of time.

On the other hand, setting the reference level too low may in certain cases lead to overcharging of the battery. Depending on the construction and material of the battery, the minimum ratio of a battery being charged may remain higher than the fixed reference level even when the battery is substantially fully charged. In such a case, the interactive adjustment process described above would continue to increase the charging voltage to the upper voltage limit of the power supply and keep it there, which could cause undue overcharging and gassing of the battery.

In order to avoid such overcharging, it is preferred to set an upper limit of the charging voltage that is sufficiently low to ensure that the battery will not enter the very high gassing region of the sweep curve (e.g., portion A3 of curve A). This is necessary because it is not possible to determine from a single probe whether the battery has entered the undesirable gassing region (A3 in Curve A of FIG. 3) or is still in the lower region A2 in FIG. 3. For automobile batteries the upper charging voltage may be set at 15–15.5 volts. This works well with an automotive electrical system because the system voltage is already limited to about 15 volts to protect other system components.

It should be noted that it is generally preferable to charge the battery at the lowest voltage that will achieve a high charge. Such a voltage is generally at or below the above mentioned inflection point.

A problem with a fixed reference value is that high currents demand high voltages to overcome battery polarization such as resistance. When the battery approaches full charge, the voltage must be reduced fairly quickly to avoid pushing the charge into the upper part of the charging curve. For a fixed reference value, this can be conveniently done by restricting the upper voltage and by making the reference value moderate when compared to the ideal value measured on a fully charged battery.

TECHNIQUE TWO

Instead of using a fixed reference level through out the charging process as in Technique One described above, it is also possible to use a reference level which is dynamically adjusted over the charging process to allow more optimal tuning of the charging voltage.

For example, in the following technique, the reference level is set to a relatively high fixed value at the beginning of the charging process. A voltage step is periodically applied to the battery 30 being charged, a ratio (either the current ratio or the slope) is computed and compared to the reference level, and the charging voltage is adjusted accordingly. When the measured ratio falls below the initial reference level, a second reference level which is dynamically adjusted by weighted averaging is used in the subsequent charging process.

Figure 6A:
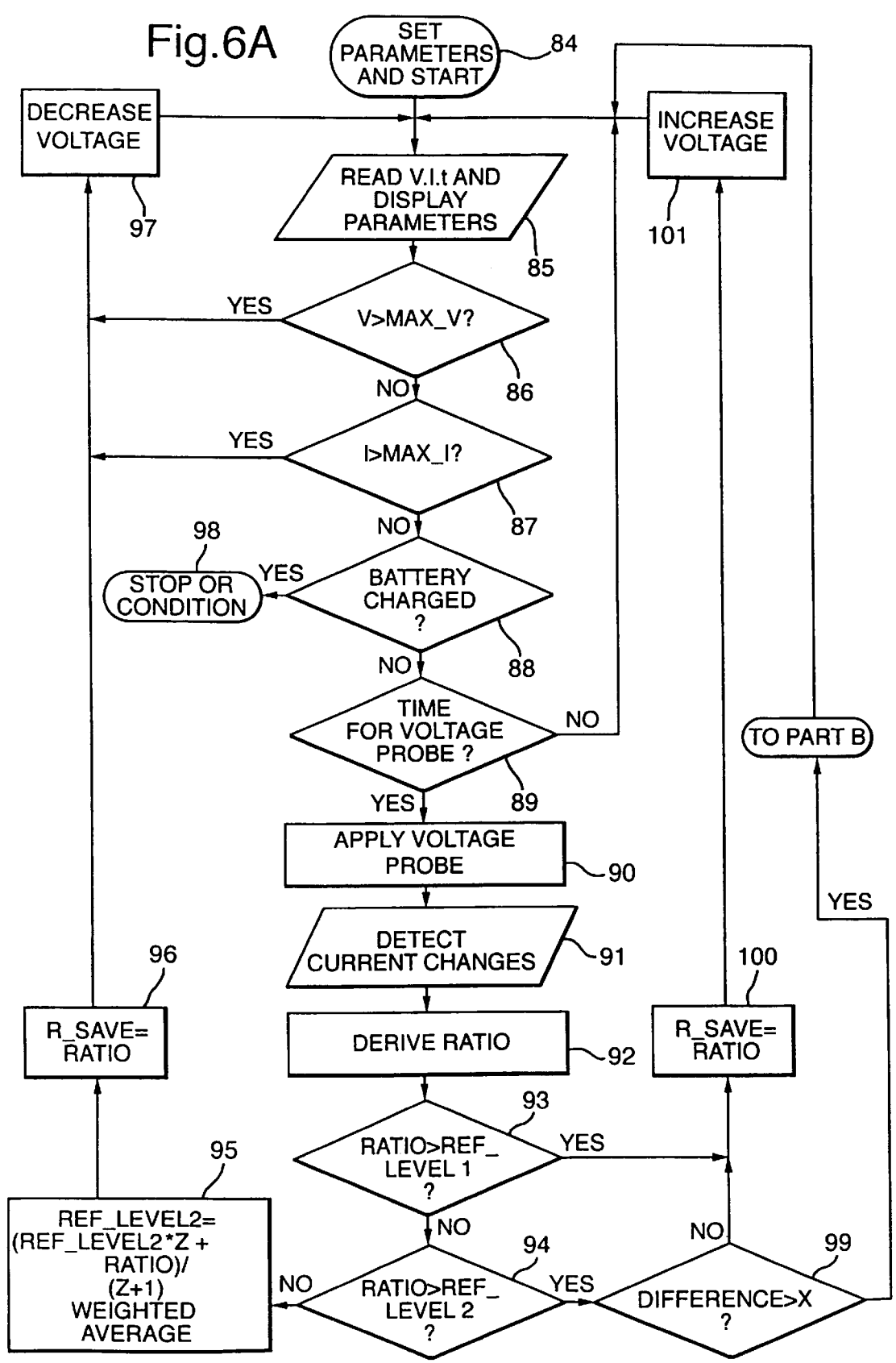
FIGS. 6A and 6B provide a flow diagram for a second exemplary interactive voltage adjustment technique in accordance with the teachings of the present invention.
Figure 6B:
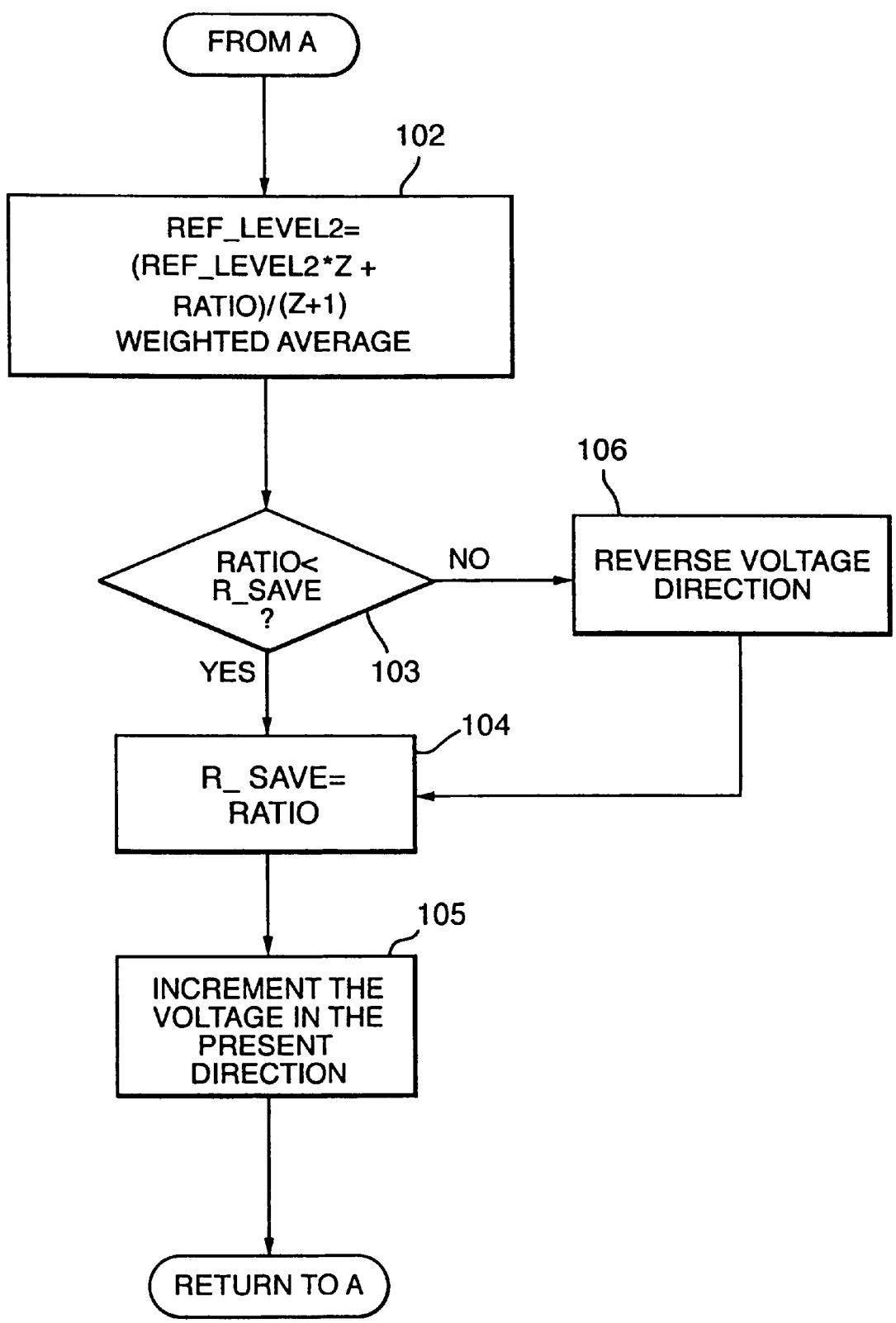

In more detail, referring to FIGS. 6A and 6B, at the beginning of the charging process, initial charging parameters are set (step 84). This involves setting a first reference level that is fixed, and the initial value of a second reference level that can be varied later. The charging voltage is initially set at a relatively low voltage. The first reference level is set at a relatively high value (e.g., 0.5 to 0.9 when the surge-plateau ratio is used as the control parameter).

During the charging process, the voltage and current are checked. If the voltage exceeds the upper voltage limit (MAX_V) (step 86) or if the current exceeds the upper current limit (MAX_I) (step 87), the charging voltage is reduced (step 97). Alternatively, if it is determined that the battery has been fully charged (step 88), the charging process is stopped or switched into a conditioning mode (step 98).

When it is determined that the time to probe has arrived (step 89), the voltage controller applies a voltage step to the battery (step 90), and the resultant current changes are detected (step 91). A ratio (which may be either the surge-plateau current ratio or the current-voltage slope) is derived from the current changes (step 92). The ratio is then compared to the fixed first reference level (step 93). If the ratio is greater than the first reference level, then the ratio is saved in the variable R_SAVE (step 100) and the voltage is increased (step 101).

If, on the other hand, it is determined that the ratio has fallen below the first fixed reference level (step 93), then the second (adjustable) reference level is used in the subsequent control. Specifically, the calculated ratio is compared to the second reference level. If the ratio is smaller than the second reference level, the second reference is adjusted by weighted averaging as:

Ref_Level2=(Ref_Level2*z+ratio)/(z+1), where Ref_Level2 is the value of the second reference level, and z is a weighting constant. The ratio is saved in a variable called R_SAVE (step 96). The charging voltage is then decremented (step 97), preferably according to the difference between the ratio and the second reference level.

If the measured ratio is greater than the reference level, then it is further determined whether the difference between the ratio and the second reference level exceeds a preset value x (step 99). If the difference is smaller than x, the ratio is saved in the variable R_SAVE (step 100), and the charging voltage is increased, preferably by an amount according to the difference between the ratio and the second reference level.

If, however, the difference between the ratio and the second reference level exceeds x, then the charge acceptance of the battery has changed markedly, and the simple control scheme of increasing (or decreasing) the charging voltage when the ratio is greater (or smaller) than the presently used reference level can no longer be reliably used for controlling the charging process.

In the preferred embodiment, the detection of a ratio-reference difference greater than x starts a sequence of dynamically switching the voltage adjustment direction to allow the measured ratio to move toward a more stable lower value. This sequence is generally illustrated in FIG. 6B. The second reference is first reset (step 102) by weighted averaging as:

Ref_Level2=(Ref_Level2*z+ratio)/(z+1).

It is then determined whether the measured ratio is smaller than R_SAVE (step 103). If the ratio is smaller than R_SAVE, then the value of R_SAVE is replaced by that of the ratio (step 104). Because the application of the last voltage change appears to have generated a lower ratio, which indicates a more optimal charging condition, the next voltage change is applied in the same voltage adjustment direction as that of the previous change so that the ratio may be further reduced. The direction (i.e., positive or negative) of the voltage adjustment will be maintained as long as each probe voltage step results in a further reduction of the ratio as compared to the previous ratio saved in R_SAVE.

If, however, it is determined that the probe voltage step results in a ratio that is greater than the previous ratio saved in R_SAVE (step 103), then the direction of the voltage adjustment is reversed (step 106). In other words, the next voltage adjustment will be applied in a direction opposite to that of the last one so that the voltage change is likely to result in a reduction of the ratio. R_SAVE is then reset to contain the value of the ratio (step 104).

In this way, the charging voltage is periodically adjusted, and the second reference level is dynamically reset by weighted averaging, to achieve optimal charging performance. The minimum stable ratio search technique illustrated in FIG. 6B provides a transition from high current at low states-of-charge to a balance point between high-efficiency low-rate charging (e.g., the portion A2 of curve A of FIG. 3) and undue gassing (e.g., portion A3 of curve A of FIG. 3).

The two exemplary techniques described above illustrate that simple yet effective charging techniques can be developed based on the use of voltage steps to repeatedly probe the charging state of the battery 30 and to dynamically and interactively adjust the charging output of the DC power supply 32 to achieve substantially optimized charging performance.

In a preferred embodiment, the surge-plateau current ratio is used as the control parameter for the charging process. Using the current ratio associated with the voltage steps as the control parameter of the charging process has many advantages. For example, because the plateau current 50 resulting from the application of a voltage step is generally smaller than the surge current 48, the current ratio is generally within the range of zero to one. In other words, the current ratio is generally "normalized." Due to its generally finite range and predictable behavior, the current ratio can be handled easily by the voltage controller 34 in the interactive charging process.

It is possible, however, for the current ratio to go outside the range of 0 to 1. For instance, the ratio can be higher than one at the beginning of the charge process when the battery is highly discharged. In such a case, the surge current region does not rise fast enough to surpass the asymptotic current and the measured "surge current" would be somewhat dependent on timing. For convenience, any reading of the current ratio above 1 may be treated as 1 and any reading below 0 may be treated as 0. This will avoid wild or spurious readings and keep the control parameter for all batteries in a normalized range. Using the fixed range of 0 to 1 allows batteries of similar construction but different capacities to be controlled easily using either Technique one or Technique two described above.

Furthermore, because both the surge current 48 and the plateau current 50 induced by the application of a voltage step vary substantially linearly with the magnitude of the voltage step, the current ratio is substantially independent of the magnitude of the voltage step as long as the voltage step is sufficiently small. Thus, it is not crucial to have precise control of the magnitude of the voltage steps. This is especially advantageous in commercial automotive charging systems where precise voltage control is difficult or expensive to achieve.

Moreover, the time required for measuring a current ratio is relatively short, because the plateau current 50 is reached quickly after the application of a voltage step, typically within 0.3–1.0 second depending on the battery type. Such fast response time is important for avoiding disturbances to the measurement in an automotive electrical system having a variety of devices which are frequently turned on or off.

An important advantage of using small voltage steps as probes is that each voltage step is significantly smaller than the nominal operation voltage of the battery 30 being charged. Thus, no high voltage pulses or current surges will be generated which could cause interference with other devices connected to the battery 30, such as changing the headlight intensity or affecting the alternator loading which could be noticeable and annoying to the vehicle operator. In addition, unlike some prior art charging systems, the inventive system will not generate large pulses that create electromagnetic fields, thereby avoiding interference and other adverse effects.

The frequency at which the voltage steps should be applied to the battery to probe the charging status depends on many factors, such as the precision of voltage control desired, the tolerance of disturbances caused by applying the voltage steps, and the size of the voltage steps. Generally, if the magnitude of the voltage steps is relatively small (e.g., 0.01 volt to 0.02 volt), the voltage steps can be applied fairly often (e.g., 1 voltage step every second), and small charging voltage adjustments can be made accordingly. On the other hand, if the voltage step is relatively large (e.g., about 0.2 volt or higher), the voltage steps may be applied less frequently, such as once every 10 to 20 seconds, and correspondingly large voltage adjustments can be made.

It should be noted that the voltage steps can be either positive or negative, i.e., a voltage step can be up or down from the base voltage level. The same relationship between the surge current 48 and the plateau current 50 exists for both step directions if the power supply 32 has a sufficiently fast response and is not near its current limit. Whether the positive or negative steps are preferred depends on the charging situations. With a downward voltage step, the surge current pulse 48 may be truncated if the base current 45 is close to zero. On the other hand, if the power supply is already operating near the upper current limit, which is frequently the case at the beginning of the charging process of a substantially discharged battery, applying a positive voltage step may not have a discernible effect on the charging current. In such a case, however, a negative step can be used for measuring the current ratio. Accordingly, downward voltage steps may be used at the upper current limit of the power supply, and upward steps can be made when the charging current is low. A transition from downward steps to upward steps could occur when the first instance of negative current is encountered.

By virtue of the use of a ratio (either the surge-plateau current ratio or the current-voltage slope) associated with each voltage step as a meaningful indicator of the battery charging efficiency, and the interactive nature of the voltage adjustment, the method of the present invention automatically takes into account the charging characteristics of the battery 30 being charged. For instance, the method of the present invention automatically compensates for the internal resistance of the battery 30 being charged which varies with the size and construction components of the battery 30. As a result, at the same charging current limits, higher charging voltages are generally applied to small batteries to compensate for their higher internal resistance, and lower charging voltages are applied to larger batteries of the same general construction which have lower internal resistance.

Another advantage of the invention is that the inventive method compensates for the temperature effects, including polarization effects, on the charging characteristics of the battery. Colder batteries generally receive a higher voltage even though their currents will generally be lower due the lower charge acceptance caused by the lower solubility of discharge products at lower temperatures. By virtue of its interactive nature, the inventive method is capable of compensating for the temperature effects to efficiently charge the batteries.

The method also adjusts the charging voltage in response to the charge acceptance of the battery 30 at different charging stages; a factor which is affected by the history of use of the battery. For example, the rate at which the battery 30 was previously discharged affects the current acceptance of the battery. Thus, batteries that have been rapidly discharged generally recharge more swiftly by charging at a high rate until the battery is nearly fully charged. The charging voltage then begins to drop rapidly, resulting in a low end current. In contrast, in batteries that have been slowly discharged, especially those that have discharged during extended shelf storage, the charging voltage and current begin to taper off well before the full charge point. As another example, a battery that was 100% discharged and then 90% recharged will charge quite differently from a battery that was 10% discharged at the same rate.

The following Examples are provided to illustrate the general operational principles and the effectiveness of the present method for charging lead-acid batteries. The plateau-surge current ratio is used in these examples as the control parameter.

EXAMPLE 1

Figure 7A:
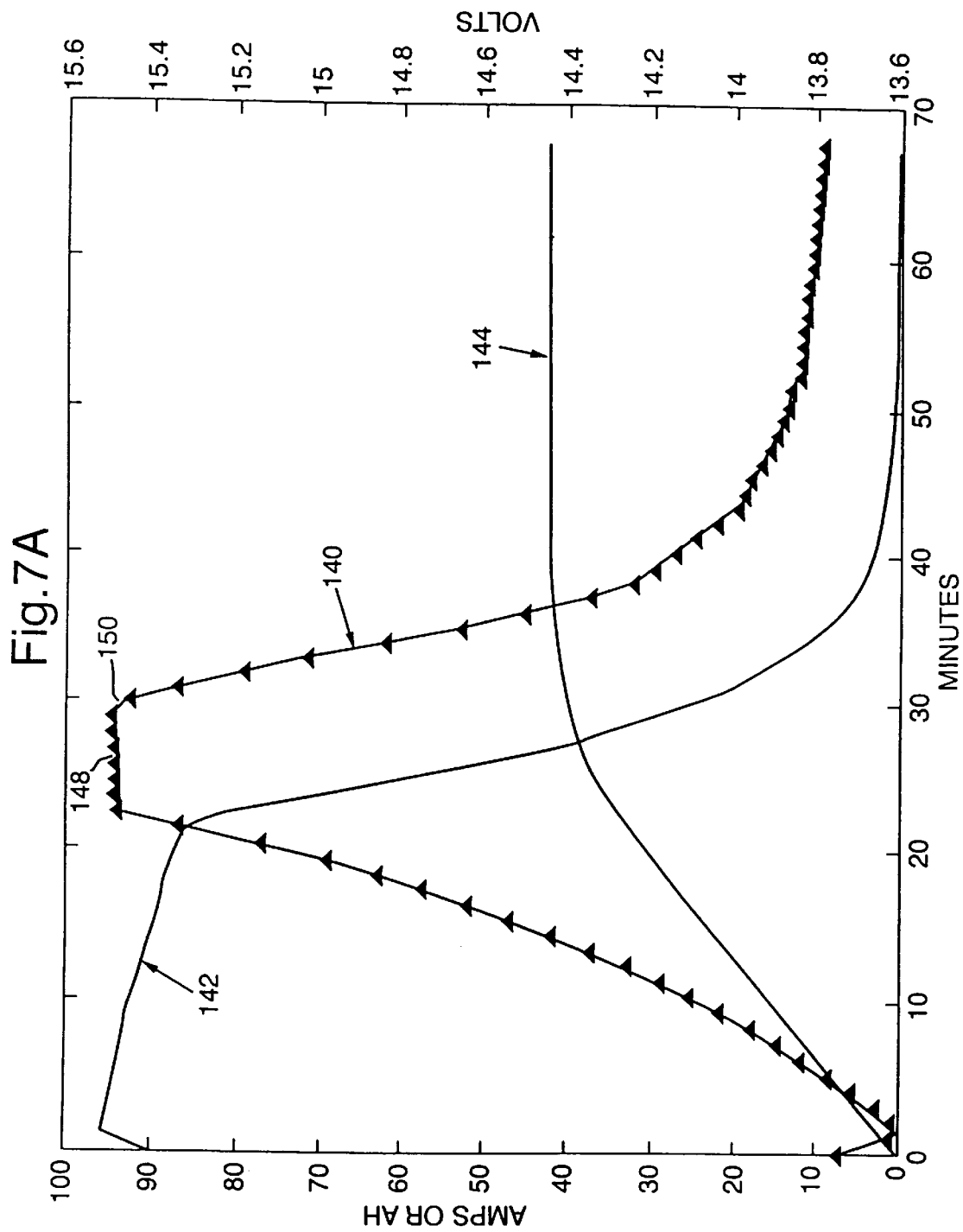
FIGS. 7A & 7B are graphs showing data of a charging process using the technique shown in FIG. 5.
Figure 7B:
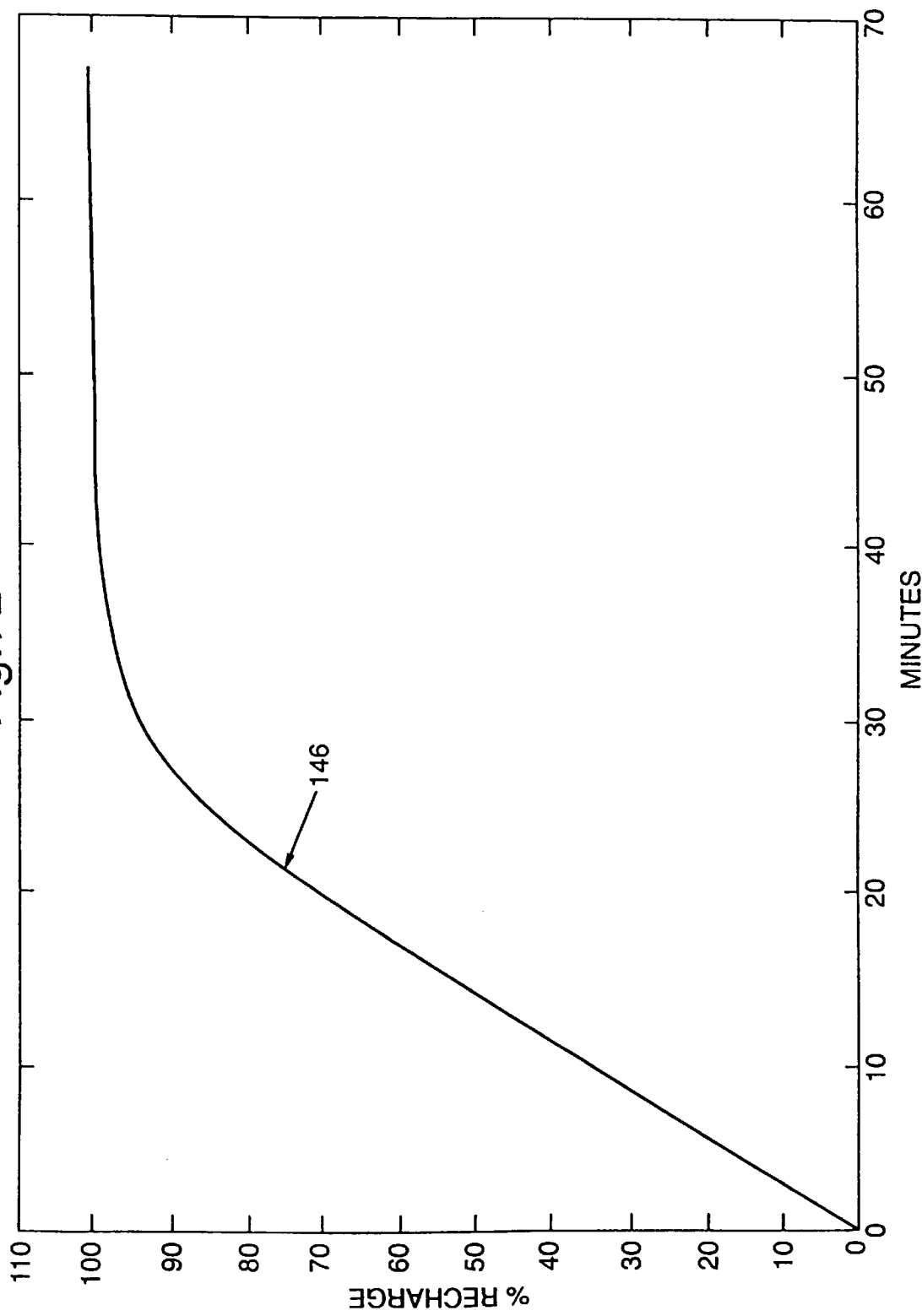

FIGS. 7A and 7B illustrate the charging process of a commercially available Group 65 automotive battery 30 using Technique One described above. The reference level for the current ratio is fixed at 0.2, and the upper limit for the charging voltage is set at 15.5 volts. The voltage steps applied to the battery 30 are negative steps with a 0.1 volt magnitude. FIG. 7A shows the output voltage curve 140 and current curve 142 of the DC power supply 32, and the cumulated charging capacity curve 144 in Ampere-hour (AH). FIG. 7B shows the state-of-charge curve 146 of the battery as a function of time.

As can be seen in FIG. 7A, the charging voltage starts at a relatively low value (curve 140), while the current (curve 142) at the beginning of the charging process is substantially limited by the power-corrected current output capability of the power supply 32. The high current in the initial charging stage efficiently charges the battery 30 when the charge acceptance is high. As the charging progresses, the charging voltage is gradually increased until it reaches a plateau 148 corresponding to the preset voltage limit. After the measured current ratio becomes smaller than the reference level at point 150, the charging voltage is gradually reduced as the state-of-charge of the battery approaches 100%, and the current falls nearly to zero.

The existence of a plateau portion 148 in the voltage curve 140 indicates that imposing an upper limit on the charging voltage (in this case at 15.5 volts) may reduce the maximum current output and therefore compromise the charging efficiency when the upper voltage limit is reached. Such an upper voltage limit is, however, necessary in certain cases to avoid undue overcharging and possible damage to other components attached to the battery system, such as light bulbs.

EXAMPLE 2

Figure 8A:
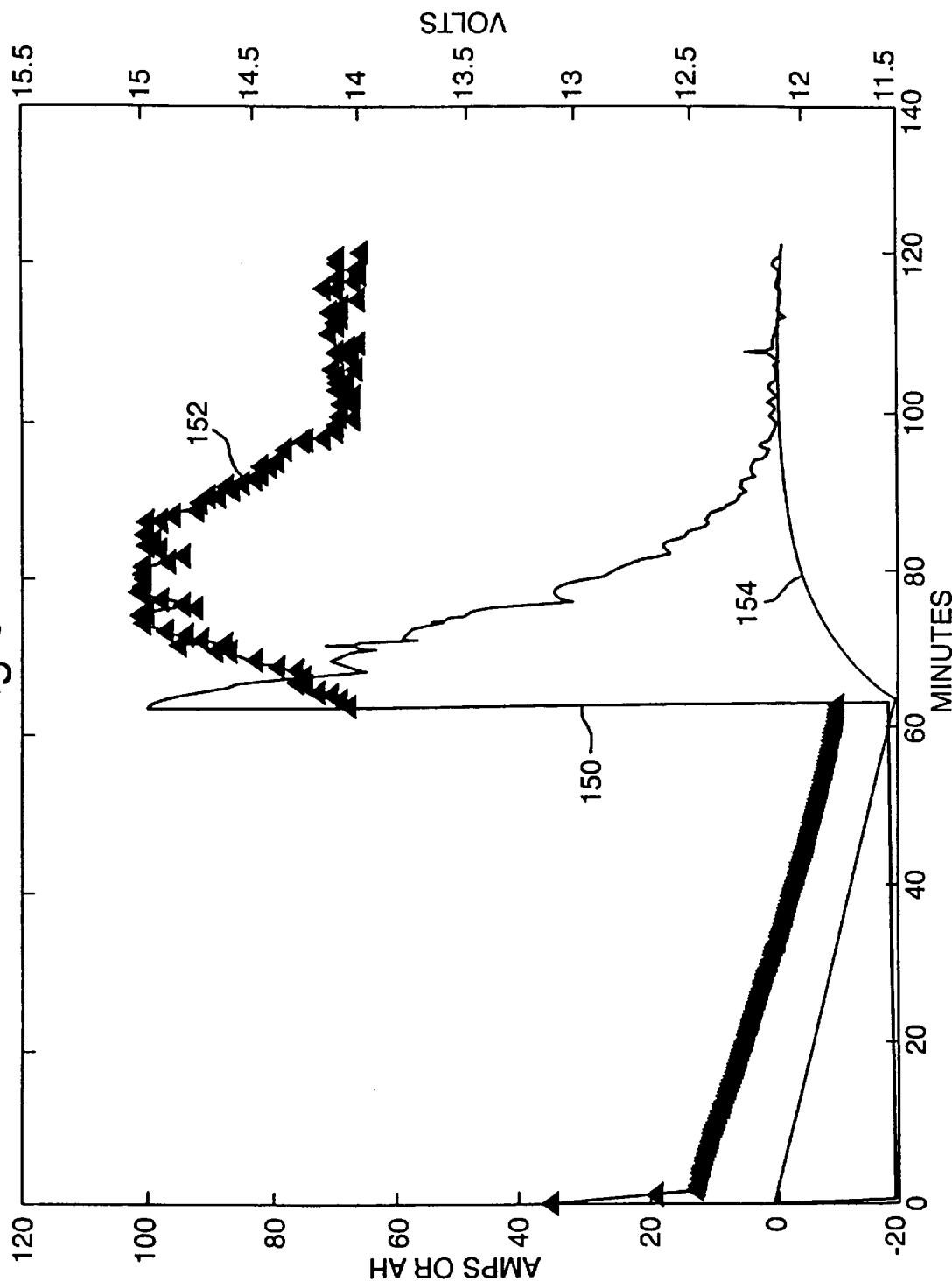

FIGS. 8A and 8B illustrate the charging process of a battery mounted in a commercially available vehicle with an internal combustion engine. The vehicle has an alternator coupled to the engine for generating electrical energy when the engine is operating. The battery is charged by the electrical energy generated by the alternator, and the charging process is controlled according to Technique One described above.

The battery is first discharged by turning on the high-beam headlights of the vehicle with the engine off. This is indicated in the current curve 150 as a −20 Ampere current drain. After the battery has been discharged about 20 Ah, the engine is turned on at idle speed, and the alternator starts to charge the battery. As shown in the state-of-charge curve 156 in FIG. 8B, the battery is rapidly recharged to a fully charged state. As can be seen in the voltage curve 152 in FIG. 8A, the charging voltage rises at the beginning to the set limit and then smoothly drops to a relatively low voltage at the end. The upper limit of the charging voltage in this example is set at 15 volt. As previously noted, it is generally desired by automobile manufacturers to keep the charging voltages as low as possible to extend the life of other electrical components, such as light bulbs, of the automobile.

EXAMPLE 3

Figure 9A:
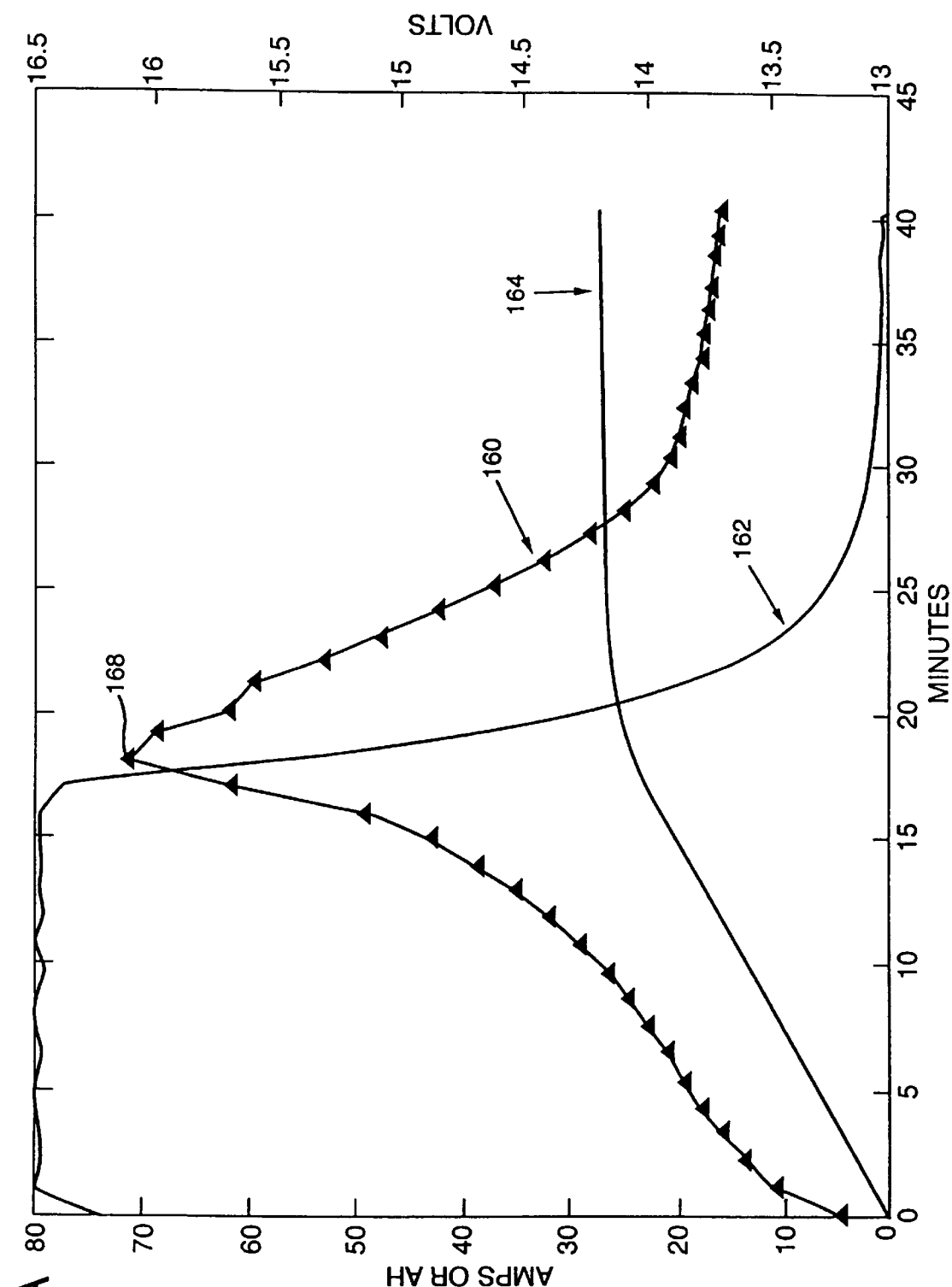
FIGS. 9A & 9B are graphs showing charging status data for a battery being charged using the technique of FIGS. 6A and 6B.
Figure 9B:
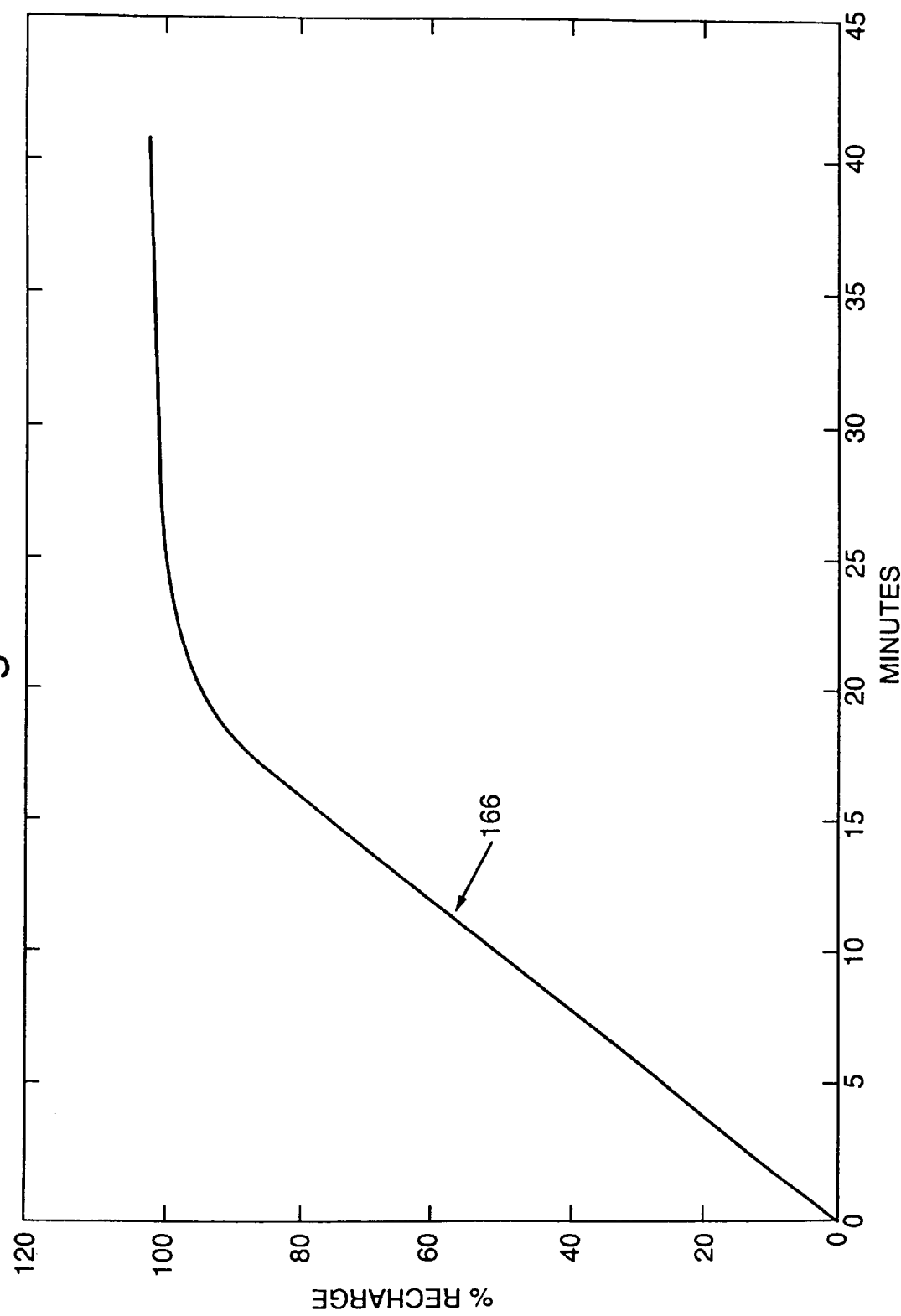

FIGS. 9A and 9B illustrate an exemplary charging process for a typical Commercially available Group 65 battery using Technique Two described above. In this example, the initial reference level is set at 0.9. FIG. 9A shows the voltage curve 160, the current curve 162, and the cumulative capacity curve 164. FIG. 9B shows the state-of-charge curve 166.

At the beginning of the charging process, the current (curve 162) stays at the preset upper current limit (80 Amp) of the power supply 32, while the charging voltage (curve 160) is gradually increased. At point 168, the measured current ratio falls below the initial reference level. The "lower ratio" search sequence as described in conjunction with FIG. 6B is then performed in which the periodic voltage steps scan the charging voltage up or down. The reference level is also adjusted in this sequence according to the measured current ratio. Thus, voltage steps are periodically applied to the battery 30, and the charging voltage (curve 160) is periodically adjusted according to the measured current ratios in comparison with the new reference level. As shown in FIG. 9A, the charging voltage (curve 160) and current (curve 162) fall gradually as the battery 30 approaches its fully charged state.

EXAMPLE 4

Figure 10:
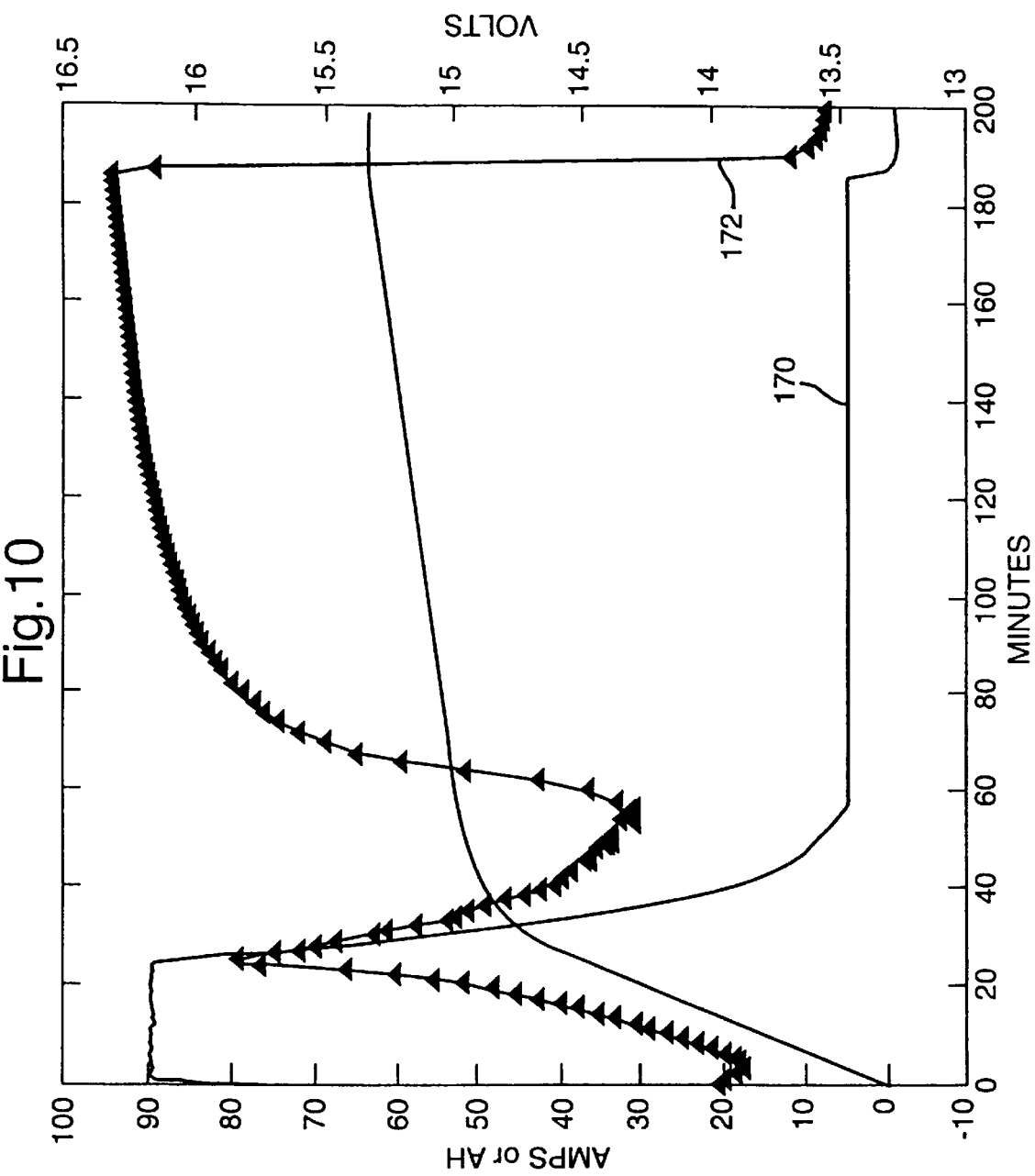
FIG. 10 is another graph showing charging status data for a battery being charged using the technique of FIGS. 6A and 6B.

FIG. 10 shows another exemplary charging process which uses Technique Two described above to charge a battery to a substantially full level and then switches to a conditioning mode. Instead of letting the current drop to zero and the voltage drop to a relatively low value near the end of the charging process, this process maintains a small but steady charge current as shown by the current curve 170, and the voltage (voltage curve 172) is allowed to vary. This has the effect of equalizing the cells and destratifying the electrolyte of the battery.

It should be noted that the measurement of the plateau current should be taken after the it has sufficiently stabilized to ensure an accurate determination of the ratio. The time between measuring the surge current and measuring the plateau current should be sufficiently large such that further increase of time yields only a sufficiently small variation of the ratio (e.g., by less than 0.005).

TECHNIQUE THREE

The two techniques and four examples described above apply voltage steps to the battery being charged to probe the charging efficiency, and the charging voltage is adjusted to optimize the charging performance. It will be appreciated, however, that in accordance with the invention a controlled charging process can also be implemented by controlling the charging current and applying small current steps to probe the battery being charged.

FIG. 11 shows a charging system 200 constructed according to the invention for current-controlled charging. The system 200 includes a controller 202 which controls the current output of a DC power supply 204 for charging the battery 206. The controller 202 has a step generator 208 for controlling the DC power supply 204 to generate current steps in the charging current. The voltage changes in response to the current step are detected by a voltage detector 210. An analyzer 212 determines a control parameter from the detected voltage changes in response to the current step. The charging current is then varied by the current controller 202 according to the control parameter.

FIG. 12 shows a general example of how the charging voltage changes in response to a current step. The charging current as a function of time is indicated by the current curve 216, and the charging voltage as a function of time is indicated by the voltage curve 218. Immediately before the current step 220 is applied, the charging voltage is in a substantially steady state condition defined as a base voltage 222. When the charging current is increased by the current step 220, the charging voltage initially rises rapidly and then levels off to a new steady state condition represented by the plateau voltage 224. The plateau voltage is typically reached within several tenths of a second after the current step, depending on the specific type and construction of the battery being charged.

In contrast to the response of the charging current to a voltage step as illustrated in FIG. 2A, the application of a current step typically does not generate a surge peak in the charging voltage. Rather, the charging voltage continuously rises from the base voltage 222 to the plateau voltage 224. For illustration purposes, the current step 220 in FIG. 12 is in the positive direction. It will be appreciated, however, that negative current steps may be applied for probing the battery, and the voltage response to a negative current step is generally the mirror image of the voltage response to a positive step as shown in FIG. 12.

The transient voltage changes induced by a current step depend on the charging status of the battery. More particularly, the charging status of the battery determines how fast the charging voltage rises (or falls) in response to a positive (or negative) current step. For a substantially discharged battery, the voltage may rise rapidly to the plateau voltage, while for a battery that is nearly fully charged the voltage may rise at a slower rate.

Analogous to the techniques using voltage steps as probes, a ratio may be derived from the voltage changes in response to a current step and used as an indicator of the charge efficiency. In a preferred embodiment, the base voltage 222, the plateau voltage 224, and a transient voltage 226 are measured. The transient voltage 226 is measured at a short period of time, such as 0.1 second, after the current step is applied to the battery. A transient-plateau voltage ratio, defined as the difference between the transient voltage and the base voltage divided by the difference between the plateau voltage and the base voltage, is then calculated. Analogous to the plateau-surge current ratio for a voltage step, this transient-plateau voltage ratio may be used in controlling the charging process.

Figure 13:
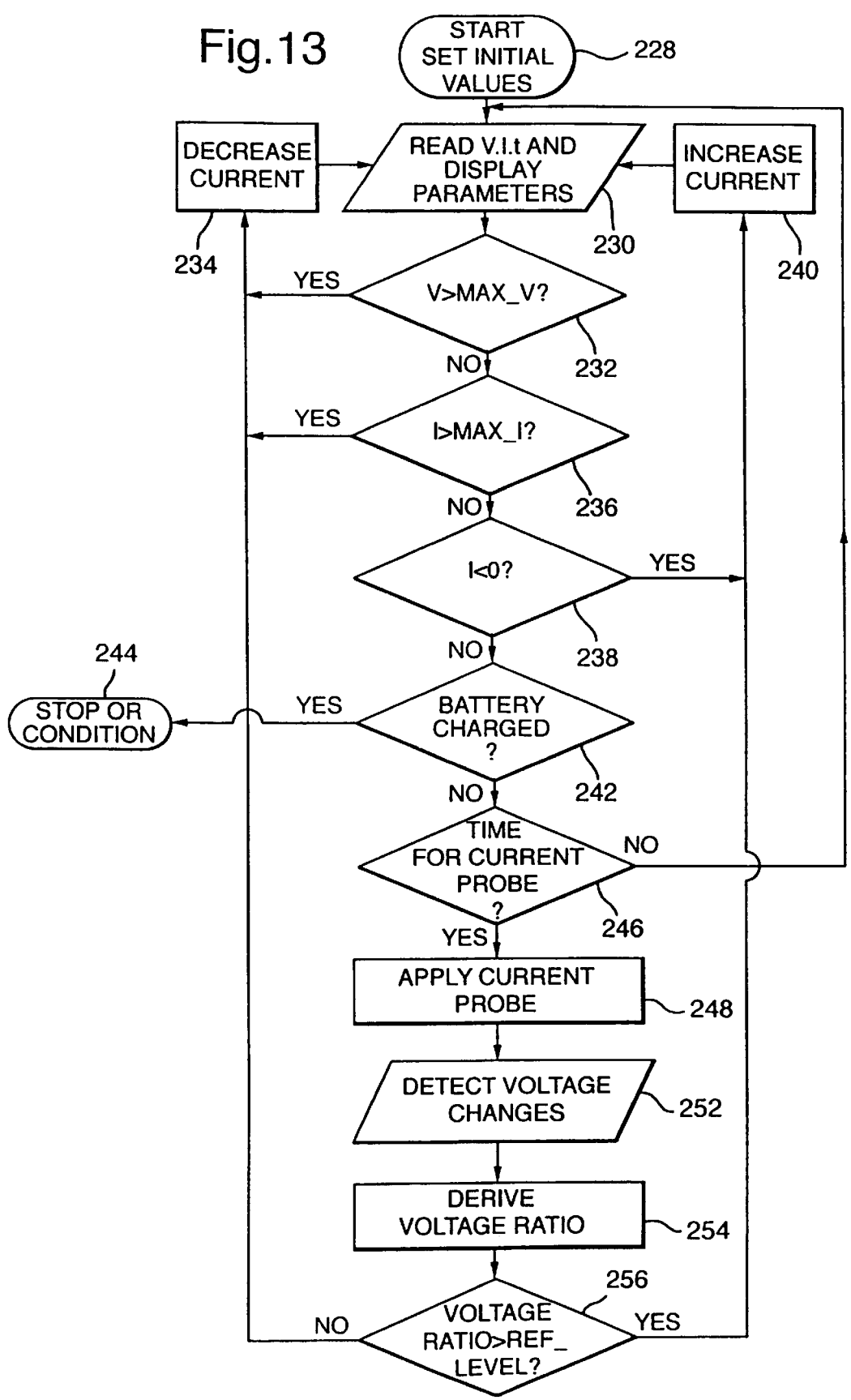
FIG. 13 is a flow diagram showing a current-controlled charging technique according to the invention which applies current steps to probe the battery being charged.

FIG. 13 shows a simple current-controlled charging technique using current steps as probes. This technique is analogous to Technique One described above. As illustrated in FIG. 13, at the beginning of the charging process, the initial parameters, including the initial charging current and a fixed reference level, are set (step 228). The initial charging current set by the current controller may be at a relatively high level, which may be the current limit of the charger.

As the charging continues, the charging voltage and current as well the charging time are detected and may optionally be displayed on a monitoring device (step 230). The charging voltage is checked to see whether it exceeds a preset upper voltage limit (MAX_V) (step 232). If so, the charging current is decreased (step 234). If not, the current is checked to see whether it exceeds a preset upper current limit (MAX_I) (step 236). If so, the current is decreased (step 234). If it is determined that the charging current is negative (step 238), then the charging current is increased to provide a positive current to the battery (step 240).

If the charging voltage and current do not exceed the preset limits and the charging current is not negative, it is then determined whether the battery has been fully charged (step 242). This determination may be made, for instance, by checking the magnitude of the charging current. If the charging current has dropped below a small fraction (such as 10%) of the input capacity of the battery or a small value (such as 2 Amperes), the battery may be deemed fully charged. If the battery is found to be fully charged, the charging is either stopped or switched into a conditioning mode (step 244). In the conditioning mode, the current is kept at a small constant value and the charging voltage is monitored to equalize the cells and destratify the electrolyte of the battery.

When it is determined that the time to measure the transient-plateau voltage ratio has arrived (step 246), the current controller causes the power supply to change the charging current by a small step (step 248), which can be either positive or negative. Negative current steps may be used until a negative charging current is reached.

Because the charging current may vary significantly over the charging process, it is preferred to dynamically adjust the magnitude of the current step to more effectively probe the charging state. In the preferred embodiment, the current step magnitude 250 (FIG. 12) is set to be a small fraction (such as 10%) of the charging current plus a constant small addition (such as 0.5 Amp). The small constant addition is added to ensure that the current step magnitude is sufficient to allow accurate measurements even when the charging current is low.

The voltage detector senses the voltage changes caused by the current step (step 252). The measured voltage values are then used by the analyzer to calculate a transient-plateau voltage ratio (step 254). The calculated ratio is then compared to the fixed reference level (step 256). If the ratio is higher than the reference value, the charging current is increased (step 240). On the other hand, if the measured ratio is below the reference level, then the charging current is decreased (step 234). Because the magnitude of the charging current may vary significantly, preferably the amount of current increase or decrease is adjusted according to the magnitude of the charging current. The above described steps are then periodically repeated as the charging continues.

This charging technique with a single fixed reference level is relatively simple to implement. It will be appreciated by those skilled in the art that more complex techniques, such as one analogous to Technique Two described above which uses a dynamically adjusted reference level, may be implemented according to the teaching of the invention.

EXAMPLE 5

Figure 14:
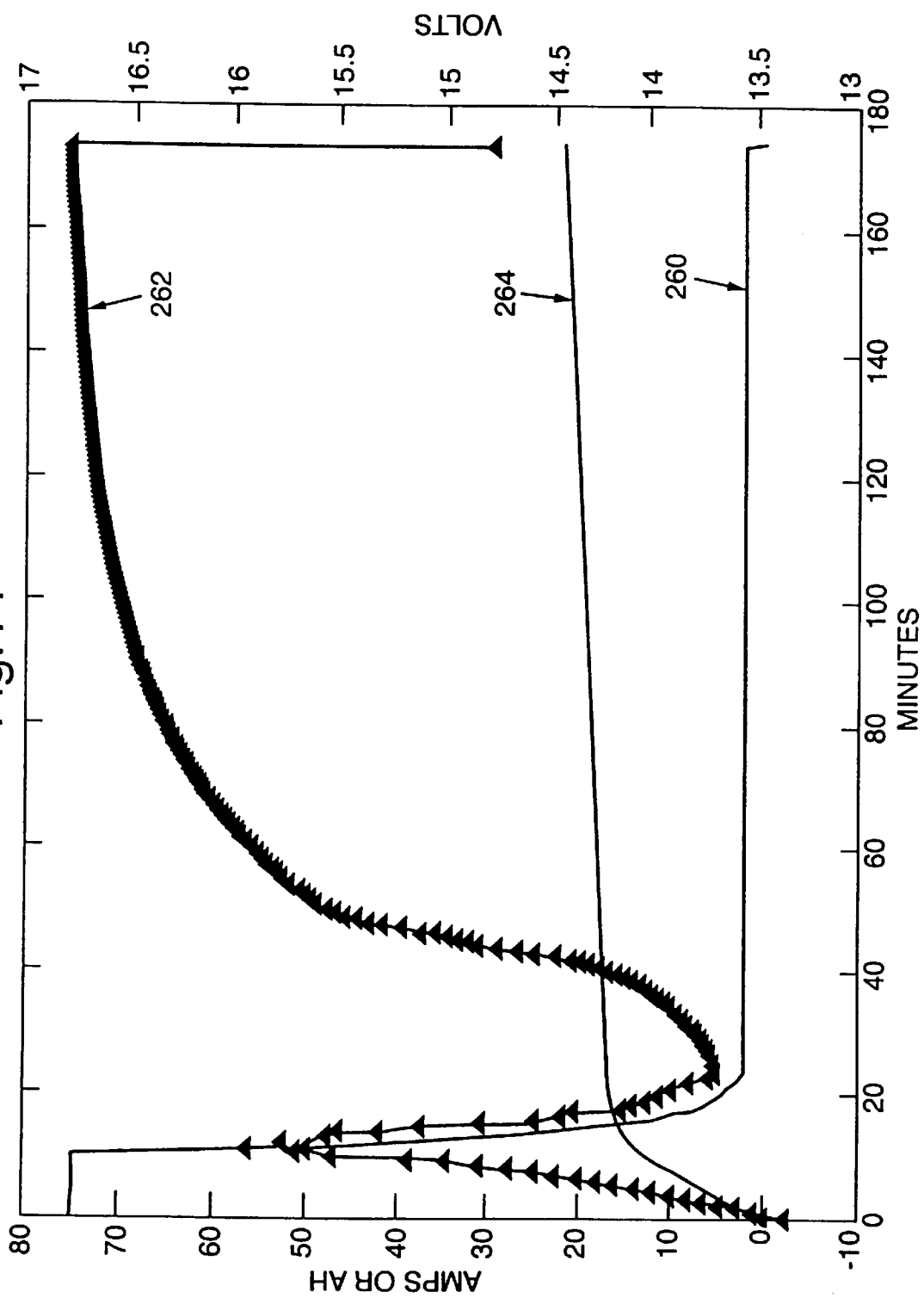
FIG. 14 is a graph showing charging status data for a battery being charged with the current-controlled technique of FIG. 13.
Figure 15:
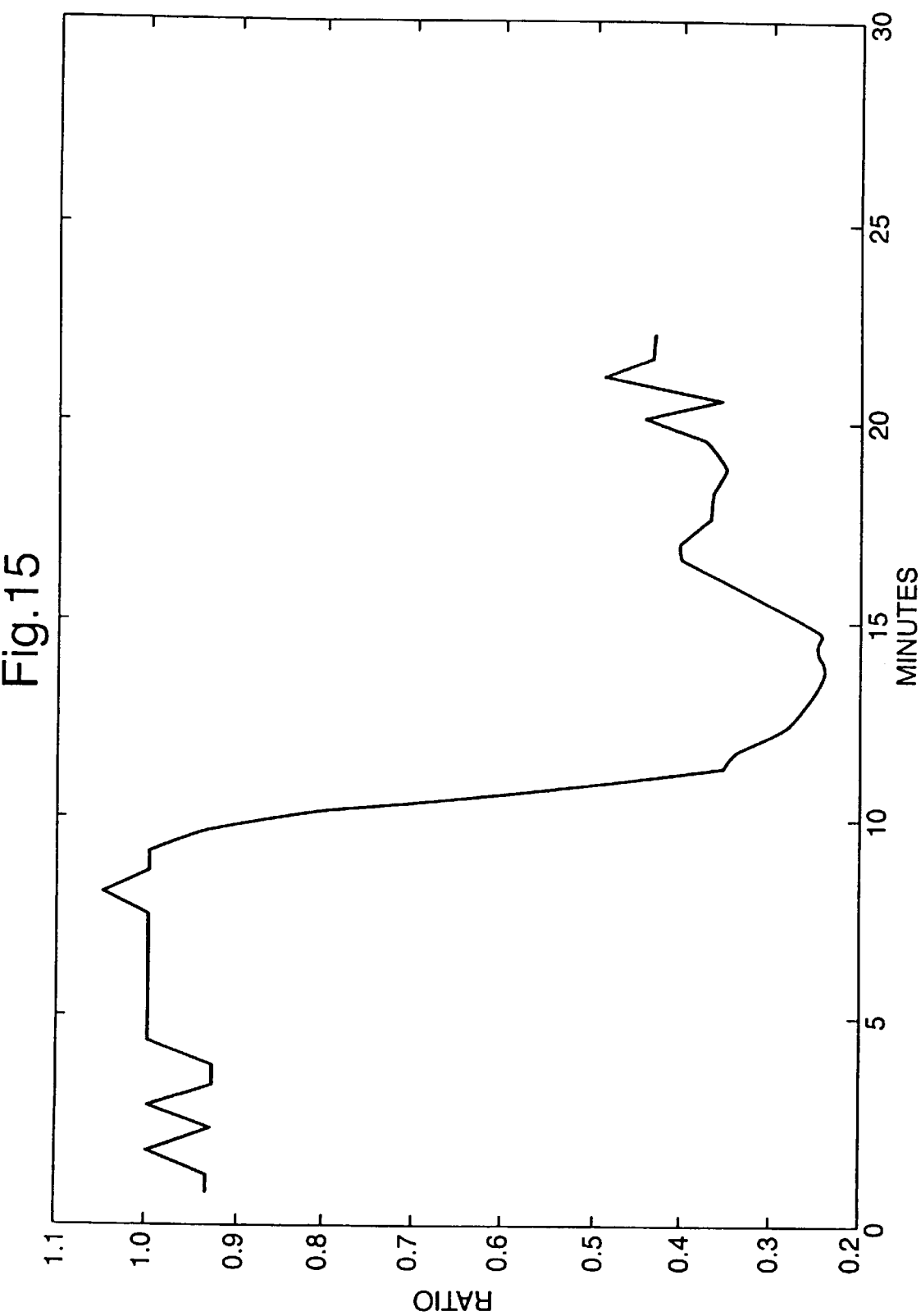
FIG. 15 is a graph showing variations over a charging process of a ratio derived from voltage changes in response to a current step and used to control the charging process.

Again by way of example, FIGS. 14 and 15 show data of a charging process in which a Group 24 automotive battery is charged with Technique Three described above. The fixed reference level for this charging process is set at 0.4. The charging current is limited to 75 Amperes, and the charging voltage is limited to 16 volts.

During the charging process, a probe current step is applied every 10 seconds. The magnitude of the probe current step is set to be 10% of the charging current plus 0.5 Amp. For each probe current step, a transient voltage is measured at 0.1 second after the current step, and a plateau current is measured at 0.25 second after the current step.

When the transient-plateau current ratio falls below the fixed reference level, the charging current is reduced by 0.5 times the magnitude of the probe current step. When the transient-plateau current ratio is above the reference level, the charging current is increased by an amount equal to the difference between the ratio and the reference level times the magnitude of the probe current step.

FIG. 14 shows the charging current curve 260, charging voltage curve 262, and the cumulative charging capacity curve 264 in ampere-hour (Ah). The charging current stays high at the beginning of the charging process then drops continuously as the charging continues. After the current falls to 2 amperes, it is kept at that level to condition the battery. FIG. 15 shows the variations of the measured transient-plateau voltage ratio over the charging process.

In view of the foregoing detailed description, those skilled in the art will appreciate that the disclosed invention may be used to charge many different types of batteries, including, but not limited to, sealed and recombinant lead acid batteries, without departing from the scope of the invention. Although the invention is not limited to use with a particular battery type, those skilled in the art will appreciate that the invention is particularly useful for charging recombinant batteries since when so charged, those batteries will not experience thermal run-away due to high charging voltages or currents.

Moreover, those skilled in the art will appreciate that, although certain values for voltages and currents have been disclosed herein, all of those values were presented in the context of charging a 12-volt lead-acid battery. The voltage and current values will of necessity differ in proportion to the capacity of the battery being charged. Thus, it will be appreciated that the values of current and voltage given herein are by way of illustration, not limitation.

What is claimed is:

1. A method of controllably charging a battery over a charging period, comprising the steps of:
   connecting a charging voltage to the battery;
   applying a plurality of separate and distinct voltage steps in the charging voltage to the battery, the plurality of voltage steps being distributed over the charging period and each having a step magnitude significantly smaller than the charging voltage applied to the battery, for each of the plurality of voltage steps:
      detecting current changes induced by said each voltage step;
      calculating a ratio from the detected current changes; and
      varying the charging voltage according to the ratio.

2. The method of claim 1, wherein the step of varying comprises the steps of comparing the ratio to a reference level and changing the charging voltage in a voltage change direction in accordance with a result of the comparison.

3. The method of claim 2, wherein the voltage change direction is negative when the current ratio is smaller than the reference level and positive when the current ratio is greater than the reference level.

4. The method of claim 3, wherein the reference level has a fixed value.

5. The method of claim 2, further including the step of dynamically adjusting the reference level in accordance with the calculated ratio.

6. The method of claim 5, wherein the step of dynamically adjusting includes the steps of:
   comparing the calculated ratio with a previously stored comparison ratio when the calculated ratio is greater than the reference level by a difference more than a preselected value;
   when the calculated ratio is greater than the comparison ratio, reversing the voltage change direction;
   storing the calculated ratio as the comparison ratio; and
   adjusting the reference level according to the calculated ratio by weighted averaging.

7. The method of claim 2, wherein the step of detecting measures a base current immediately before said each voltage step is applied, a surge current after said each voltage step is applied, and a plateau current after the surge current, and wherein the ratio is calculated as the difference between the plateau current and the base current divided by the difference between the surge current and the base current.

8. The method as in claim 2, wherein the ratio is calculated as a current-to-voltage slope.

9. The method of claim 1, wherein at least one of the plurality of voltage steps is positive.

10. The method of claim 1, wherein at least one of the plurality of voltage steps is negative.

11. The method of claim 1, wherein the plurality of voltage steps are in the range of 0.01–0.3 volt for a 12-volt battery.

12. The method of claim 1, further comprising the step of maintaining the charging voltage below an upper limit to prevent charging the battery at a high gassing rate or damaging devices attached to the battery.

13. An apparatus for charging a battery comprising:
   a variable DC power supply for providing adjustable charging voltage and charging current to the battery;
   a voltage controller for controlling the charging voltage of the variable DC power supply over a charging period and for applying a plurality of separate and distinct voltage steps distributed over the charging period to the battery for probing charging efficiency, each of the voltage steps having a step magnitude significantly smaller than the charging voltage applied to the battery;
   a current detector for detecting current changes in response to said each voltage step; and
   an analyzer for determining a ratio from the detected current changes for said each voltage step,
   the voltage controller being coupled to the analyzer for varying the charging voltage according to the ratio for said each voltage step.

14. The apparatus of claim 13, wherein the voltage controller adjusts the charging voltage of the variable DC power supply in a voltage change direction according to a comparison of the ratio to a reference level.

15. The apparatus of claim 14, wherein the voltage controller increases the charging voltage when the ratio is greater than the reference level and reduces the charging voltage when the ratio is smaller than the reference level.

16. The apparatus of claim 14, wherein the reference level is a preselected fixed value.

17. The apparatus of claim 14, wherein the analyzer dynamically adjusts the reference level according to the ratio.

18. The apparatus of claim 17, wherein the analyzer reverses the voltage change direction when the calculated ratio is greater than the reference level by more than a preselected value and when the calculated ratio is greater than a previously stored comparison ratio.

19. The apparatus of claim 13, wherein at least one of the plurality of voltage steps is positive.

20. The apparatus of claim 13, wherein at least one of the plurality of voltage steps is negative.

21. The apparatus of claim 13, wherein the plurality of voltage steps are in the range of 0.01–0.3 volt for a 12-volt battery.

22. The apparatus of claim 13, wherein the current detector measures a base current immediately before said each voltage step is applied, a surge current after said each voltage step is applied, and a plateau current after the surge current, and wherein the ratio is calculated as a difference between the plateau current and the base current divided by a difference between the surge current and the base current.

23. The apparatus of claim 13, wherein the ratio is calculated as a current-to-voltage slope.

24. A method of charging a battery, comprising the steps of:
connecting a charging current to the battery;
applying a current step in the charging current to the battery;
detecting voltage changes in response to the current step;
calculating a ratio from the detected voltage changes;
varying the charging current according to the ratio.

25. The method of claim 24, wherein the step of varying comprises the steps of comparing the ratio to a reference level and changing the charging current in a current change direction in accordance with a result of the comparison.

26. The method of claim 25, wherein the reference level has a fixed value.

27. The method of claim 25, further including the step of dynamically adjusting the reference level in accordance with the calculated ratio.

28. The method of claim 24, wherein the current step is positive.

29. The method of claim 24, wherein the direction of the current step is negative.

30. The method of claim 24, wherein the current step is set to be a sum of a predetermined portion of the charging current and a predetermined minimum step magnitude.

31. An apparatus for charging a battery comprising:
a variable DC power supply for providing adjustable charging current to the battery;
a current controller coupled to the variable DC power supply for controlling the charging current and for applying a current step to the battery to probe charging efficiency;
a voltage detector for detecting voltage changes in response to the current step; and
an analyzer for determining a ratio from the detected voltage changes,
the current controller being coupled to the analyzer for varying the charging current according to the ratio.

32. The apparatus of claim 31, wherein the current controller adjusts the charging current of the variable DC power supply in a current change direction according to a comparison of the ratio to a reference level.

33. The apparatus of claim 31, wherein the current controller sets the current step to be a sum of a predetermined portion of the charging current and a predetermined minimum step magnitude.

* * * * *

UNITED STATES PATENT AND TRADEMARK OFFICE
CERTIFICATE OF CORRECTION

PATENT NO. : 6,037,751
DATED : March 14, 2000
INVENTOR(S) : Klang

It is certified that errors appear in the above-identified patent and that said Letters Patent is hereby corrected as shown below:

ON THE TITLE PAGE:

*"Attorney, Agent, or Firm*-Leydig, Voit & Mayer, Ltd." is not listed on the face of the patent.

In Column 4, Line 52: "a" should be deleted.

In Column 14, Line 35: "after the it" should read --after it--.

Signed and Sealed this

Twenty-fourth Day of April, 2001

Attest:

NICHOLAS P. GODICI

Attesting Officer

*Acting Director of the United States Patent and Trademark Office*